US011948310B2

(12) United States Patent
Guizilini et al.

(10) Patent No.: US 11,948,310 B2
(45) Date of Patent: Apr. 2, 2024

(54) SYSTEMS AND METHODS FOR JOINTLY TRAINING A MACHINE-LEARNING-BASED MONOCULAR OPTICAL FLOW, DEPTH, AND SCENE FLOW ESTIMATOR

(71) Applicant: Toyota Research Institute, Inc., Los Altos, CA (US)

(72) Inventors: Vitor Guizilini, Santa Clara, CA (US); Rares A. Ambrus, San Francisco, CA (US); Kuan-Hui Lee, San Jose, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 373 days.

(21) Appl. No.: 17/489,237

(22) Filed: Sep. 29, 2021

(65) Prior Publication Data
US 2022/0392083 A1 Dec. 8, 2022

Related U.S. Application Data

(60) Provisional application No. 63/195,796, filed on Jun. 2, 2021.

(51) Int. Cl.
*G06K 9/00* (2022.01)
*G05D 1/00* (2006.01)
(Continued)

(52) U.S. Cl.
CPC ............ *G06T 7/248* (2017.01); *G05D 1/0221* (2013.01); *G05D 1/0246* (2013.01); *G06N 3/045* (2023.01);
(Continued)

(58) Field of Classification Search
CPC ........................................................ G06T 7/73
See application file for complete search history.

(56) References Cited

U.S. PATENT DOCUMENTS

| 7,764,808 B2 * | 7/2010 | Zhu ..................... G06V 10/255 |
| | | 382/104 |
| 10,733,745 B2 * | 8/2020 | Pizer ..................... G06V 20/40 |
| (Continued) | | |

OTHER PUBLICATIONS

A. Gorlitz, J. Geiping, and A. Kolb. Piecewise rigid scene flow with implicit motion segmentation. In 2019 IEEE/RSJ International Conference on Intelligent Robots and Systems (IROS), pp. 1758-1765, 2019.

(Continued)

*Primary Examiner* — Hadi Akhavannik
(74) *Attorney, Agent, or Firm* — Christopher G. Darrow; Darrow Mustafa PC

(57) ABSTRACT

Systems and methods described herein relate to jointly training a machine-learning-based monocular optical flow, depth, and scene flow estimator. One embodiment processes a pair of temporally adjacent monocular image frames using a first neural network structure to produce a first optical flow estimate; processes the pair of temporally adjacent monocular image frames using a second neural network structure to produce an estimated depth map and an estimated scene flow; processes the estimated depth map and the estimated scene flow using the second neural network structure to produce a second optical flow estimate; and imposes a consistency loss between the first optical flow estimate and the second optical flow estimate that minimizes a difference between the first optical flow estimate and the second optical flow estimate to improve performance of the first neural network structure in estimating optical flow and the second neural network structure in estimating depth and scene flow.

20 Claims, 7 Drawing Sheets

(51) Int. Cl.
  *G06N 3/045* (2023.01)
  *G06N 3/08* (2023.01)
  *G06T 7/246* (2017.01)
  *G06T 7/50* (2017.01)
  *G06T 7/55* (2017.01)
  *G06T 7/73* (2017.01)

(52) U.S. Cl.
  CPC .............. *G06N 3/08* (2013.01); *G06T 7/50* (2017.01); *G06T 7/55* (2017.01); *G06T 7/73* (2017.01); *G06T 2207/10024* (2013.01); *G06T 2207/20081* (2013.01); *G06T 2207/20084* (2013.01)

(56) References Cited

U.S. PATENT DOCUMENTS

| | | | |
|---|---|---|---|
| 11,107,230 B2* | 8/2021 | Pillai | G06V 10/82 |
| 11,138,751 B2* | 10/2021 | Guizilini | G06V 10/7788 |
| 2017/0008521 A1* | 1/2017 | Braunstein | B60W 40/06 |
| 2020/0084427 A1 | 3/2020 | Sun et al. | |
| 2020/0211206 A1* | 7/2020 | Wang | G06N 3/08 |
| 2020/0265590 A1* | 8/2020 | Daniilidis | G06T 7/269 |
| 2022/0277647 A1* | 9/2022 | Guo | G06V 20/54 |

OTHER PUBLICATIONS

Z. Lv, K. Kim, A. Troccoli, D. Sun, J. Rehg, and J. Kautz. Learning rigidity in dynamic scenes with a moving camera for 3d motion field estimation. In ECCV, 2018.

X. Liu, C. R. Qi, and L. J. Guibas. Flownet3d: Learning scene flow in 3d point clouds. In 2019 IEEE/CVF Conference on Computer Vision and Pattern Recognition (CVPR), 2019.

W. Wu, Z. Y. Wang, Z. Li, W. Liu, and L. Fuxin. Pointpwc-net: Cost volume on point clouds for (self-) supervised scene flow estimation. In European Conference on Computer Vision,331 pp. 88-107. Springer, 2020.

L. Liu, G. Zhai, W. Ye, and Y. Liu. Unsupervised learning of scene flow estimation fusing with local rigidity. In Proceedings of the Twenty-Eighth International Joint Conference on Artificial Intelligence, IJCAI-19, pp. 876-882. International Joint Conferences on Artificial Intelligence Organization, Jul. 2019.

Y. Chen, C. Schmid, and C. Sminchisescu. Self-supervised learning with geometric constraints in monocular video: Connecting flow, depth, and camera. In Proceedings of the IEEE international conference on computer vision, pp. 7063-7072, 2019.

Z. Yin and J. Shi. Geonet: Unsupervised learning of dense depth, optical flow and camera pose. In CVPR, 2018.

K. Cho, B. van Merriënboer, C. Gulcehre, D. Bahdanau, F. Bougares, H. Schwenk, and Y. Bengio. Learning phrase representations using RNN encoder-decoder for statistical machine translation. In Proceedings of the 2014 Conference on Empirical Methods in Natural Language Processing (EMNLP). Association for Computational Linguistics, 2014.

T. Zhou, P. Krahenbuhl, M. Aubry, Q. Huang, and A. A. Efros. Learning dense correspondence via 3d-guided cycle consistency. In Proceedings of the IEEE Conference on Computer Vision and Pattern Recognition, pp. 117-126, 2016.

M. Menze, C. Heipke, and A. Geiger. Joint 3d estimation of vehicles and scene flow. In Proc. of the ISPRS Workshop on Image Sequence Analysis (ISA), 2015.

M. Menze, C. Heipke, and A. Geiger. Object scene flow. ISPRS Journal of Photogrammetry and Remote Sensing (JPRS), 2018.

Y. Cabon, N. Murray, and M. Humenberger. Virtual kitti 2, 2020.

A. Gaidon, Q. Wang, Y. Cabon, and E. Vig. Virtual worlds as proxy for multi-object tracking analysis. In Proceedings of the IEEE conference on computer vision and pattern recognition, pp. 4340-4349, 2016.

Parallel domain. https://paralleldomain.com/, Nov. 2020.

S. Zhao, H. Fu, M. Gong, and D. Tao. Geometry-aware symmetric domain adaptation for monocular depth estimation. In Proceedings of the IEEE Conference on Computer Vision and Pattern Recognition, pp. 9788-9798, 2019.

K. PNVR, H. Zhou, and D. Jacobs. Sharingan: Combining synthetic and real data for unsupervised geometry estimation. In The IEEE/CVF Conference on Computer Vision and Pattern Recognition (CVPR), Jun. 2020.

A. Gurram, A. F. Tuna, F. Shen, O. Urfalioglu, and A. M. Lopez. Monocular depth estimation through virtual-world supervision and real-world sfm self-supervision, 2021.

R. Li, S. Wang, Z. Long, and D. Gu. Undeepvo: Monocular visual odometry through unsupervised deep learning. In 2018 IEEE international conference on robotics and automation (ICRA), pp. 7286-7291. IEEE, 2018.

N. Yang, R. Wang, J. Stückler, and D. Cremers. Deep Virtual Stereo Odometry: Leveraging Deep Depth Prediction for Monocular Direct Sparse Odometry. In ECCV, 2018.

J. Hur and S. Roth. Self-supervised monocular scene flow estimation. In CVPR, 2020.

V. Guizilini, I. Vasiljevic, R. Ambrus, G. Shakhnarovich, and A. Gaidon. Full surround monodepth from multiple cameras, 2021.

J. Y. Jason, A.W. Harley, and K. G. Derpanis. Back to basics: Unsupervised learning of optical flow via brightness constancy and motion smoothness. In European Conference on Computer Vision, pp. 3-10. Springer, 2016.

Z. Ren, J. Yan, B. Ni, B. Liu, X. Yang, and H. Zha. Unsupervised deep learning for optical flow estimation. In Proceedings of the AAAI Conference on Artificial Intelligence, 2017.

P. Liu, M. Lyu, I. King, and J. Xu. Selflow: Self-supervised learning of optical flow. In Proceedings of the IEEE/CVF Conference on Computer Vision and Pattern Recognition, pp. 4571-4580, 2019.

N. Sundaram, T. Brox, and K. Keutzer. Dense point trajectories by gpu-accelerated large displacement optical flow. In European conference on computer vision, pp. 438-451. Springer, 2010.

R. Jonschkowski, A. Stone, J. T. Barron, A. Gordon, K. Konolige, and A. Angelova. What matters in unsupervised optical flow. arXiv preprint arXiv:2006.04902, 2020.

M. Jaderberg, K. Simonyan, A. Zisserman, and K. Kavukcuoglu. Spatial transformer networks. arXiv preprint arXiv:1506.02025, 2015.

A. Geiger, P. Lenz, C. Stiller, and R. Urtasun. Vision meets robotics: The kitti dataset. The International Journal of Robotics Research, 32(11):1231-1237, 2013.

Y. Zou, Z. Luo, and J.-B. Huang. Df-net: Unsupervised joint learning of depth and flow using cross-task consistency. In European Conference on Computer Vision, 2018.

U.S. Appl. No. 17/489,237, filed Sep. 29, 2021 to Guizilini, titled, "Systems and Methods for Jointly Training a Machine-Learning-Based Monocular Optical Flow, Depth, and Scene Flow Estimator".

A. Paszke et al. "Automatic Differentiation in PyTorch." NIPS—2. 2017.

Z. Teed et al. Raft: Recurrent All-Pairs Field Transforms for Optical Flow. Computer Vision—ECCV 2020—16th European Conference, 2020, Proceedings. Springer Science and Business Media Deutschland GmbH, 2020.

D. P. Kingma and J. Ba. Adam: A method for stochastic optimization. arXiv preprint arXiv:1412.6980, 2014.

Z. Teed and J. Deng. Raft-3d: Scene flow using rigid-motion embeddings, 2021.

V. Guizilini, J. Li, R. Ambrus, and A. Gaidon. Geometric unsupervised domain adaptation for semantic segmentation, 2021.

F. Brickwedde, S. Abraham, and R. Mester. Mono-sf: Multi-view geometry meets single-view depth for monocular scene flow estimation of dynamic traffic scenes. In Proceedings of the IEEE/CVF International Conference on Computer Vision (ICCV), Oct. 2019.

J. Hur and S. Roth. Self-supervised multi-frame monocular scene flow. In CVPR, 2021.

A. Dosovitskiy, P. Fischer, E. Ilg, P. Hausser, C. Hazirbas, V. Golkov, P. Van Der Smagt, D. Cremers, and T. Brox. Flownet: Learning optical flow with convolutional networks. In Proceedings of the IEEE international conference on computer vision, pp. 2758-2766, 2015.

(56) References Cited

OTHER PUBLICATIONS

D. J. Butler, J. Wulff, G. B. Stanley, and M. J. Black. A naturalistic open source movie for optical flow evaluation. In European Conf. on Computer Vision (ECCV), Part IV, LNCS 7577, pp. 611-625. Springer-Verlag, Oct. 2012.
N. Mayer, E. Ilg, P. Häusser, P. Fischer, D. Cremers, A. Dosovitskiy, and T. Brox. A large dataset to train convolutional networks for disparity, optical flow, and scene flow estimation. 2016 IEEE Conference on Computer Vision and Pattern Recognition (CVPR), pp. 4040-4048, 2016.
H. Zhao, O. Gallo, I. Frosio, and J. Kautz. Loss functions for image restoration with neural networks. IEEE Transactions on Computational Imaging, 3(1):47-57, 2017.
Z. Wang, A. C. Bovik, H. R. Sheikh, and E. P. Simoncelli. Image quality assessment: from error visibility to structural similarity. IEEE transactions on image processing, 13(4):600-612, 2004.
J.Watson, O.M. Aodha, V. Prisacariu, G. Brostow, andM. Firman. The Temporal Opportunist: Self-Supervised Multi-Frame Monocular Depth. In Computer Vision and Pattern Recognition (CVPR), 2021.
D. Eigen and R. Fergus. Predicting depth, surface normals and semantic labels with a common multi-scale convolutional architecture. In Proceedings of the IEEE international conference on computer vision, pp. 2650-2658, 2015.
D. Eigen, C. Puhrsch, and R. Fergus. Depth map prediction from a single image using a multi-scale deep network. arXiv preprint arXiv:1406.2283, 2014.
A. Saxena, M. Sun, and A. Y. Ng. Make3d: Learning 3d scene structure from a single still image. IEEE transactions on pattern analysis and machine intelligence, 31(5):824-840, 2008.
P. K. Nathan Silberman, Derek Hoiem and R. Fergus. Indoor segmentation and support inference from rgbd images. In ECCV, 2012.
H. Fu, M. Gong, C. Wang, K. Batmanghelich, and D. Tao. Deep ordinal regression network for monocular depth estimation. In Proceedings of the IEEE Conference on Computer Vision and Pattern Recognition, pp. 2002-2011, 2018.
A. Geiger, P. Lenz, and R. Urtasun. Are we ready for autonomous driving? the kitti vision benchmark suite. In Computer Vision and Pattern Recognition (CVPR), 2012 IEEE Conference on, pp. 3354-3361. IEEE, 2012.
C. Godard, O. Mac Aodha, and G. J. Brostow. Unsupervised monocular depth estimation with left-right consistency. In Proceedings of the IEEE Conference on Computer Vision and Pattern Recognition, pp. 270-279, 2017.
T. Zhou, M. Brown, N. Snavely, and D. G. Lowe. Unsupervised learning of depth and ego-motion from video. In Proceedings of the IEEE Conference on Computer Vision and Pattern Recognition, pp. 1851-1858, 2017.
V. Guizilini, R. Ambrus, S. Pillai, A. Raventos, and A. Gaidon. 3d packing for self-supervised monocular depth estimation. In IEEE Conference on Computer Vision and Pattern Recognition (CVPR), 2020.
H. Zhan, C. Saroj Weerasekera, R. Garg, and I. Reid. Self-supervised learning for single view depth and surface normal estimation. arXiv preprint arXiv:1903.00112v1, 2019.
V. Guizilini, R. Hou, J. Li, R. Ambrus, and A. Gaidon. Semantically-guided representation learning for self-supervised monocular depth. In International Conference on Learning Representations (ICLR), Apr. 2020.
M. Klingner, J.-A. Termöhlen, J. Mikolajczyk, and T. Fingscheidt. Self-supervised monocular depth estimation: Solving the dynamic object problem by semantic guidance. In European Conference on Computer Vision, pp. 582-600. Springer, 2020.
C. Godard, O.Mac Aodha, M. Firman, and G. J. Brostow. Digging into self-supervised monocular depth prediction. In CCV, 2019.
C. Shu, K. Yu, Z. Duan, and K. Yang. Feature-metric loss for self-supervised learning of depth and egomotion. In ECCV, 2020.
R. Ambrus, V. Guizilini, J. Li, S. Pillai, and A. Gaidon. Two Stream Networks for Self-Supervised Ego-Motion Estimation. In Conference on Robot Learning (CoRL), Oct. 2019.
A. Gordon, H. Li, R. Jonschkowski, and A. Angelova. Depth from videos in the wild: Unsupervised monocular depth earning from unknown cameras. In Proceedings of the IEEE/CVF International Conference on Computer Vision, pp. 8977-8986, 2019.
I. Vasiljevic, V. Guizilini, R. Ambrus, S. Pillai, Burgard, G. Shakhnarovich, and A. Gaidon. Neural ray surfaces for self-supervised learning of depth and ego-motion. In 3DV, 2020.
S. Vijayanarasimhan, S. Ricco, C. Schmid, R. Sukthankar, and K. Fragkiadaki. Sfm-net: Learning of structure and motion from video. ArXiv, abs/1704.07804, 2017.
M. Zhai, X. Xiang, N. Lv, and X. Kong. Optical flow and scene flow estimation: A survey. Pattern Recognition, 114:107861, 2021.
T. Brox and J. Malik. Large displacement optical flow: descriptor matching in variational motion estimation. IEEE transactions on pattern analysis and machine intelligence, 33(3): 500-513, 2010.
P. Weinzaepfel, J. Revaud, Z. Harchaoui, and C. Schmid. Deepflow: Large displacement optical flow with deep matching. In Proceedings of the IEEE international conference on computer vision, pp. 1385-1392, 2013.
E. Ilg, N. Mayer, T. Saikia, M. Keuper, A. Dosovitskiy, and T. Brox. Flownet 2.0: Evolution of optical flow estimation with deep networks. In 2017 IEEE Conference on Computer Vision and Pattern Recognition (CVPR), pp. 1647-1655, 2017.
T.-W. Hui, X. Tang, and C. C. Loy. LiteFlowNet: A Lightweight Convolutional Neural Network for Optical Flow Estimation. In Proceedings of IEEE Conference on Computer Vision and Pattern Recognition (CVPR), pp. 8981-8989, 2018.
J. Hur and S. Roth. Iterative residual refinement for joint optical flow and occlusion estimation. In CVPR, 2019.
G. Yang and D. Ramanan. Volumetric correspondence networks for optical flow. In H. Wallach, H. Larochelle, A. Beygelzimer, F. d'Alche'-Buc, E. Fox, and R. Garnett, editors, Advances in Neural Information Processing Systems, vol. 32. Curran Associates, Inc., 2019.
Z. Yin, T. Darrell, and F. Yu. Hierarchical discrete distribution decomposition for match density estimation. In The IEEE Conference on Computer Vision and Pattern Recognition (CVPR), Jun. 2019.
Y. Jiao, G. Shi, and T. D. Tran. Optical flow estimation via motion feature recovery. arXivpreprint arXiv:2101.06333, 2021.
A. Ranjan and M. J. Black. Optical flow estimation using a spatial pyramid network. In Proceedings of the IEEE conference on computer vision and pattern recognition, pp. 4161-4170, 2017.
D. Sun, X. Yang, M.-Y. Liu, and J. Kautz. PWC-Net: CNNs for optical flow using pyramid, warping, and cost volume. In CVPR, 2018.
S. Vedula, P. Rander, R. Collins, and T. Kanade. Three-dimensional scene flow. IEEE Transactions on Pattern Analysis and Machine Intelligence, 27(3):475-480, 2005.
F. Huguet and F. Devernay. A variational method for scene flow estimation from stereo sequences. In 2007 IEEE 11th International Conference on Computer Vision, pp. 1-7, 2007.
C. Vogel, S. Roth, and K. Schindler. View-consistent 3d scene flow estimation over multiple frames. In ECCV, vol. 8692, pp. 263-278. Springer, 2014.
M. Menze and A. Geiger. Object scene flow for autonomous vehicles. In 2015 IEEE Conference on Computer Vision and Pattern Recognition (CVPR). IEEE Computer Society, 2015.
E. Ilg, T. Saikia, M. Keuper, and T. Brox. Occlusions, motion and depth boundaries with a generic network for disparity, optical flow or scene flow estimation. In Proceedings of the European Conference on Computer Vision (ECCV), Sep. 2018.
R. Saxena, R. Schuster, O. Wasenmuller, and D. Stricker. PWOC-3D: Deep occlusion-aware end-to-end scene flow estimation. In IEEE Intelligent Vehicles Symposium (IV), 2019.
Chen et al., "Consistency Guided Scene Flow Estimation," 19 pages, arXiv:2006.11242v2 [cs.CV] Aug. 17, 2020.
Mayer et al., "A Large Dataset to Train Convolutional Networks for Disparity, Optical Flow, and Scene Flow Estimation," Proceedings

(56) References Cited

OTHER PUBLICATIONS of the IEEE Conference on Computer Vision and Pattern Recognition (CVPR), 2016, pp. 4040-4048.
Aleotti et al., "Learning End-to-End Scene Flow by Distilling Single Tasks Knowledge," The Thirty-Fourth AAAI Conference on Artificial Intelligence (AAAI-20), pp. 10435-10442, 2020.
Godard et al., "Digging Into Self-Supervised Monocular Depth Estimation," 18 pages, arXiv:1806.01260v4 [cs.CV] Aug. 17, 2019.
Teed et al., "RAFT: Recurrent All-Paris Field Transforms for Optical Flow," pp. 1-21, arXiv:2003.12039v3 [cs.CV] Aug. 25, 2020.
Teed et al., "RAFT-3D: Scene Flow using Rigid-Motion Embeddings," 12 pages, arXiv:2012.00726v2 [cs.CV] Apr. 6, 2021.
Wei et al., "PV-RAFT: Point-Voxel Correlation Fields for Scene Flow Estimation of Point Clouds," pp. 1-12, arXiv:2012.00987v2 [cs.CV] May 12, 2021.
Luo et al., "Every Pixel Counts ++: Joint Learning of Geometry and Motion with 3D Holistic Understanding, " 17 pages, arXiv:1810.06125v2 [cs.CV] Jul. 11, 2019.
Jiao et al., "EffiScene: Efficient Per-Pixel Rigidity Inference for Unsupervised Joint Learning of Optical Flow, Depth, Camera Pose and Motion Segmentation," 10 pages, arXiv:2011.08332v3 [cs.CV] May 15, 2021.
Yang et al., "Every Pixel Counts: Unsupervised Geometry Learning with Holistic 3D Motion Understanding," Proceedings of the European Conference on Computer Vision (ECCV) Workshops, pp. 1-17 (2018).
Ke et al., "Deep Multi-view Depth Estimation with Predicted Uncertainty," 7 pages, arXiv:2011.09594v2 [cs.CV] Mar. 27, 2021.
Lowe, "Distinctive Image Features from Scale-Invariant Keypoints," International Journal of Computer Vision, pp. 1-28 (2004).
Hartley et al., "Multiple View Geometry in Computer Vision (Second Edition)," Cambridge University Press, USA, 673 pages, 2003.

\* cited by examiner

SYSTEMS AND METHODS FOR JOINTLY TRAINING A MACHINE-LEARNING-BASED MONOCULAR OPTICAL FLOW, DEPTH, AND SCENE FLOW ESTIMATOR

CROSS-REFERENCE TO RELATED APPLICATION

This application claims the benefit of U.S. Provisional Patent Application No. 63/195,796, "Multi-Task Self-Supervised Learning of Optical Flow, Depth and Scene Flow," filed Jun. 2, 2021, which is incorporated by reference herein in its entirety.

TECHNICAL FIELD

The subject matter described herein relates in general to robots and, more specifically, to systems and methods for jointly training a machine-learning-based monocular optical flow, depth, and scene flow estimator.

BACKGROUND

In a variety of robotics applications, including autonomous vehicles, the robot performs scene reconstruction that includes estimating optical flow (pixel displacement between image frames), depth (distance or range), and scene flow (displacement of points in three dimensions over time). Estimating optical flow, depth, and scene flow supports a variety of downstream tasks such as object detection, object tracking, and mapping. These tasks are sometimes accomplished using three-dimensional sensors such as Light Detection and Ranging (LIDAR) sensors, but they can also be estimated from monocular two-dimensional images. In some implementations, a machine-learning-based system is trained using sample training images. Obtaining accurate estimates from such a system can be challenging and remains an active area of research because a variety of factors during the training process can negatively impact the accuracy of the estimates of optical flow, depth, and scene flow output by the trained system.

SUMMARY

An example of a system for jointly training a machine-learning-based monocular optical flow, depth, and scene flow estimator is presented herein. The system comprises one or more processors and a memory communicably coupled to the one or more processors. The memory stores an optical flow estimation module including instructions that when executed by the one or more processors cause the one or more processors to process a pair of temporally adjacent monocular image frames using a first neural network structure to produce a first optical flow estimate. The memory also stores a depth and scene flow estimation module including instructions that when executed by the one or more processors cause the one or more processors to process the pair of temporally adjacent monocular image frames using a second neural network structure to produce an estimated depth map and an estimated scene flow. The depth and scene flow estimation module also includes instructions that cause the one or more processors to process the estimated depth map and the estimated scene flow using the second neural network structure to produce a second optical flow estimate. The memory also stores a training module including instructions that when executed by the one or more processors cause the one or more processors to impose a consistency loss between the first optical flow estimate and the second optical flow estimate that minimizes a difference between the first optical flow estimate and the second optical flow estimate to improve performance of the first neural network structure in estimating optical flow and the second neural network structure in estimating depth and scene flow.

Another embodiment is a non-transitory computer-readable medium for jointly training a machine-learning-based monocular optical flow, depth, and scene flow estimator and storing instructions that when executed by one or more processors cause the one or more processors to process a pair of temporally adjacent monocular image frames using a first neural network structure to produce a first optical flow estimate. The instructions also cause the one or more processors to process the pair of temporally adjacent monocular image frames using a second neural network structure to produce an estimated depth map and an estimated scene flow. The instructions also cause the one or more processors to process the estimated depth map and the estimated scene flow using the second neural network structure to produce a second optical flow estimate. The instructions also cause the one or more processors to impose a consistency loss between the first optical flow estimate and the second optical flow estimate that minimizes a difference between the first optical flow estimate and the second optical flow estimate to improve performance of the first neural network structure in estimating optical flow and the second neural network structure in estimating depth and scene flow.

Another embodiment is a method of jointly training a machine-learning-based monocular optical flow, depth, and scene flow estimator, the method comprising processing a pair of temporally adjacent monocular image frames using a first neural network structure to produce a first optical flow estimate. The method also includes processing the pair of temporally adjacent monocular image frames using a second neural network structure to produce an estimated depth map and an estimated scene flow. The method also includes processing the estimated depth map and the estimated scene flow using the second neural network structure to produce a second optical flow estimate. The method also includes imposing a consistency loss between the first optical flow estimate and the second optical flow estimate that minimizes a difference between the first optical flow estimate and the second optical flow estimate to improve performance of the first neural network structure in estimating optical flow and the second neural network structure in estimating depth and scene flow.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
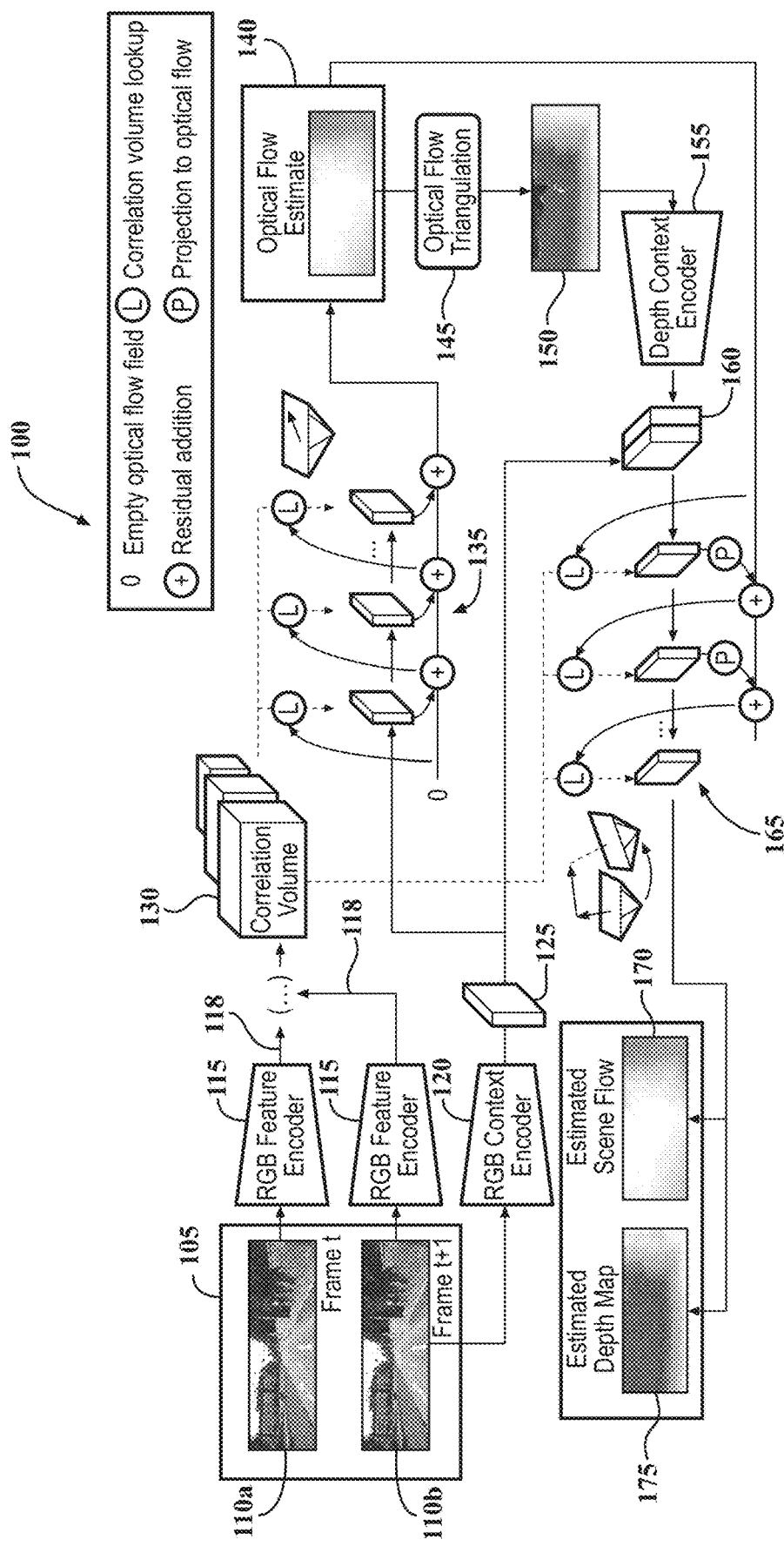
FIG. 1 illustrates an architecture of a system that jointly trains a machine-learning-based monocular optical flow, depth, and scene flow estimator, in accordance with an illustrative embodiment of the invention.

As those skilled in the art are aware, the optical-flow and depth-plus-scene-flow tasks are complementary in the sense that both tasks aim to produce the same output: the warping of information from one image onto another. Optical-flow methods operate solely on the image plane in two dimensions (2D), foregoing three-dimensional (3D) information during the warping process. In contrast, depth-plus-scene-flow methods focus on 3D reconstruction and reprojection to produce the desired warping. Conventional machine-learning-based methods described in the literature focus on either optical flow or depth plus scene flow, opting not to attempt to solve both problems simultaneously. Various embodiments disclosed herein demonstrate that it is actually better to solve both problems simultaneously because doing so improves the performance of the individual neural networks trained to perform each of the respective tasks. These various embodiments thus jointly and simultaneously train a set of neural networks to estimate optical flow, depth, and scene flow.

In some embodiments (hereinafter collectively referred to as "Embodiment 1" for brevity), a self-supervised photometric loss is used as the training object that enables the learning of either optical flow or depth plus scene flow. This is because, as noted above, the two tasks are complementary and can be used to achieve the same goal (image warping between different viewpoints). In these embodiments, a first neural network structure processes a pair of temporally adjacent monocular image frames to produce a first optical flow estimate. A second neural network structure processes the same pair of temporally adjacent monocular image frames to produce an estimated depth map and an estimated scene flow. The second neural network structure also processes the estimated depth map and the estimated scene flow to produce a second, separate optical flow estimate. The training system imposes a consistency loss between the first and second optical flow estimates that minimizes the difference between the first and second optical flow estimates. The result is that the first and second neural network structures are trained to more accurately estimate optical flow and depth plus scene flow, respectively. That is, imposing the consistency loss between the two different estimates of optical flow improves the performance of the first neural network structure in estimating optical flow and the second neural network structure in estimating depth and scene flow.

In other embodiments (hereinafter collectively referred to as "Embodiment 2" for brevity), a self-supervised photometric loss is again used as the training object that enables the learning of either optical flow or depth plus scene flow. However, instead of computing two different estimates of optical flow and imposing a consistency loss between them, as described above in connection with Embodiment 1, mid-level fusion of encoded image context features and encoded depth context features is employed to improve the estimates of depth and scene flow. More specifically, a first neural network structure processes a pair of temporally adjacent monocular image frames using a first neural network structure to produce an optical flow estimate and to extract, from at least one image frame in the pair of temporally adjacent monocular image frames, a set of encoded image context features. This optical flow estimate is similar to the one mentioned above in connection with Embodiment 1. The optical flow estimate is then triangulated to generate a depth map (an image in which the intensity of each pixel represents the distance of that pixel from the camera or vantage point from which the image was created). The system extracts a set of encoded depth context features from the depth map using a depth context encoder. The system then combines the set of encoded image context features and the set of encoded depth context features (mid-level fusion of context features) to improve the performance of a second neural network structure in estimating depth and scene flow.

In some embodiments, the techniques described above in connection with Embodiment 1 and Embodiment 2 are combined in the same training environment to achieve further improvement, compared with conventional training approaches, in the estimation of optical flow, depth, and scene flow.

The remainder of this Detailed Description is organized as follows. First, a detailed discussion is provided of an embodiment (hereinafter referred to as the "Combined Embodiment") combining the training techniques discussed above in connection with Embodiments 1 and 2, including a detailed explanation of the underlying mathematical principles. This is followed by separate descriptions of Embodiment 1 and Embodiment 2. Those descriptions are built upon the same mathematical concepts that are described in greater detail in connection with the Combined Embodiment. It should be noted that the training techniques characterizing Embodiment 1 and Embodiment 2 can be practiced separately and independently from each other, or they can be used in combination, as in the Combined Embodiment. Also, each designation, "Embodiment 1," Embodiment 2," or "Combined Embodiment," refers to a group or family of embodiments within which various implementation details and configuration particulars can differ.

The Combined Embodiment

Referring to FIG. 1, it illustrates an architecture 100 of a system that jointly trains a machine-learning-based monocular optical flow, depth, and scene flow estimator, in accordance with an illustrative embodiment of the invention. As discussed above, this family of embodiments is referred to herein collectively as the "Combined Embodiment." Architecture 100 is composed of two stages: (1) optical flow estimation (top portion of FIG. 1) and (2) depth and scene flow estimation (bottom portion of FIG. 1). These two stages are sometimes referred to herein as a "first neural network structure" (optical flow estimation) and a "second neural network structure" (depth and scene flow estimation), respectively. These two stages operate on the same input information: two temporally adjacent Red-Green-Blue (RGB) image frames, $I_t$ (110a) and $I_{t+1}$ (110b), of resolution H×W with known intrinsics K and relative pose $$T_t^{t+1} = \begin{vmatrix} R & t \\ 0 & 1 \end{vmatrix}.$$

Additionally, the depth and scene flow estimates use optical flow predictions as additional input via optical flow triangulation to produce initial depth estimates and as initialization to query a correlation volume 130. Thus, formally, the objective is to recover the function f: $(I_t, I_{t+1}) \rightarrow (d, o, s)$ that recovers depth d, optical flow o, and scene flow s, given the pair of temporally adjacent images $I_t$ and $I_{t+1}$ as input.

Optical Flow Estimation. A shared RGB feature encoder 115 $g_\theta$: $\mathbb{R}^{H \times W \times 3} \rightarrow \mathbb{R}^{H/8 \times W/8 \times 256}$ extracts 256-dimensional encoded image features 118 from the images $I_t$ and $I_{t+1}$ at ⅛ the original resolution. A similar but separate RGB context encoder 120 $g_{\theta'}$ extracts encoded image context features 125 only from $I_{t+1}$ (110b). A correlation layer (not shown in FIG. 1) constructs a W/8×H/8×W/8×H/8 four-dimensional (4D) correlation volume 130 $C_t^{t+1}$ by taking all pair-wise inner products from feature vectors $g_\theta(I_t)$ and $g_\theta(I_{t+1})$. A Gated-Recurrent-Units (GRU)-based update operator 135 uses the current optical flow estimate (initialized to zero) to look up matching values from $C_t^{t+1}$ and iteratively refines the estimate by calculating a residual value to be added to the current estimate using the encoded image context features 125 $g_{\theta'}(I_t)$ as additional input at each iterative step. This iterative process produces an optical flow estimate 140 ô.

Depth Triangulation. The optical flow estimate 140 is used to generate a depth map via triangulation. For every pixel $x_i^t = [x_i^t, y_i^t, 1]^T$ in frame t, its predicted optical flow corresponds to the displacement $ô_i$ between frames $I_t$ and $I_{t+1}$, such that $x_i^{t+1} = x_i^t + ô_i$. From this correspondence between pixels, relative rotation $R_{t+1}^t$, translation $t_t^{t+1}$ between frames, and camera intrinsics K, optical flow triangulation operator 145 calculates a triangulated depth map 150 $\overline{D}^t = \{\overline{d}_i^t, i \in [1;H] \times [1;W]\}$ by solving the following least-squares problem:

$$\overline{d}_i^t = \operatorname{argmin}_{d_i^t} \|x_i^{t+1} \times K(R_t^{t+1}(d_i^t K^{-1} x_i^t) + t_t^{t+1})\|^2, \quad (1)$$

Where $X_i = d_i^t K^{-1} x_i^t$ is the 3D point (in camera coordinate frame at time t) that projects to pixels $x_i^t$ and $x_i^{t+1}$ in frames $I_t$ and $I_{t+1}$, respectively, and × denotes the cross-product. As those skilled in the art are aware, this kind of triangulation is based on a static-world assumption. The Combined Embodiment leverages the initial triangulated depth estimate for subsequent joint estimation of depth and scene flow, as described below.

Depth and Scene Flow Estimation. The depth and scene flow estimation stage uses the same input information as the optical flow stage discussed above—i.e., the correlation volume 130 $C_t^{t+1}$ and the encoded image context features 125 $g_{\theta'}(I_t)$, plus the triangulated depth map 150 $\overline{D}^t$ calculated from the predicted optical flow ô in Eq. 1. The triangulated depth map 150 is first processed using a depth context encoder 155 $g_{\theta''}(\overline{D}^t)$ to obtain encoded depth context features 160, which are combined with the encoded image context features 125. In some embodiments, the encoded image context features 125 and the encoded depth context features 160 are numerically added (i.e., corresponding components of each are numerically added to each other). Similar to the optical flow stage, a GRU-based update operator 165 (recurrent network) is used to iteratively refine the depth and scene flow predictions. However, since, in this second stage, optical flow is not obtained directly, depth and scene flow predictions are first projected onto the image plane (2D space) before the system looks up matches in correlation volume 130:

$$\overline{o}_i^{motion} = K T_t^{t+1} (\hat{d}_i^t K^{-1} x_i^t + \hat{s}_i^t) - x_i^t, \quad (2)$$

where $\hat{d}_i^t$ and $\hat{s}_i^t$ are, respectively, an estimated depth from estimated depth map 175 and estimated scene flow 170 for pixel i in frame $I_t$. Additionally, in some embodiments, optical flow predictions are used as initial estimates for correlation-volume querying. This technique can significantly improve depth and scene flow estimation performance relative to initializing from an empty optical flow field.

Forward and Backward Estimates. To account for occluded regions between consecutive image frames, forward-backward consistency of predicted optical flow is employed, in some embodiments. Specifically, forward flow is used between frames $I_t \rightarrow I_{t+1}$ and backward flow between $I_{t+1} \rightarrow I_t$ to find inconsistent regions. Masks can be used to filter out portions of the self-supervised photometric loss and the consistency losses. Although computing these masks involves two forward passes of the model, this can be done efficiently by sharing the features of the correlation volume 130 between passes. The description of the Combined Embodiment next turns to the training of the neural networks in the first and second neural network structures discussed above.

Introduction to Training for the Combined Embodiment. Pre-training on synthetic datasets is a core component of optical flow and scene flow estimation methods due to the difficulty in obtaining real-world ground-truth labels. More recently, such pre-training on synthetic datasets has also been explored for depth estimation. In this Combined Embodiment, a mixed-batch training approach (i.e., training on both synthetic and real-world data) is employed to improve self-supervision domain transfer. In some embodiments, at each step, real and synthetic batches $\mathcal{B}_R$ and $\mathcal{B}_S$, respectively, are processed independently to generate corresponding real and synthetic losses. Formally, $\mathcal{L} = \mathcal{L}_R + \lambda_S \mathcal{L}_S$ is minimized, with $\mathcal{L}_S$ containing the supervised, self-supervised, and consistency losses described below and $\mathcal{L}_R$ containing only self-supervised and consistency losses. The parameter $\lambda_S$ is used to balance the contribution of the two loss components. The total loss is defined as follows:

$$\mathcal{L} = \mathcal{L}_{self}(\mathcal{B}_R) + \mathcal{L}_{cons}(\mathcal{B}_R) + \lambda_S(\mathcal{L}_{sup}(\mathcal{B}_S) + \mathcal{L}_{self}(\mathcal{B}_S) + \mathcal{L}_{cons}(\mathcal{B}_S)). \quad (3)$$

Supervised Losses. The supervised loss is defined as $\mathcal{L}_{sup} = \mathcal{L}_{depth} + \mathcal{L}_{optflow} + \mathcal{L}_{scnflow} + \mathcal{L}_{normal}$. The Huber loss is used for depth supervision, the L1 loss for optical flow and scene flow supervision, and the cosine similarity function is used for surface-normal regularization. Note that this supervised loss is imposed only on synthetic data, for which ground truth is available. Each of these supervised losses is defined in greater detail below.

For depth, the Smooth L1 loss (also known as Huber loss) is used to supervise depth estimation when depth maps 175 are available:

$$\mathcal{L}_{depth} = \frac{1}{HW}\sum z_n, \quad (4)$$

$$\text{where } z_n = \begin{cases} (d_i - \hat{d}_n)^2/(2*\beta) & \text{if } |d_i - \hat{d}_n| < \beta \\ |d_i - \hat{d}_n| - 0.5*\beta & \text{otherwise} \end{cases}.$$

In the Combined Embodiment, when supervising on synthetic datasets, dense annotations can be taken advantage of to apply an additional surface normal regularization term on the estimated depth maps 175. For any pixel $x=[u, v] \in D$, its surface normal vector $n \in \mathbb{R}$ can be calculated as $n=(X_{u+1,v}-X_{u,v})\times(X_{u,v+1}-X_{u,v})$, where $X=dK^{-1}x$ is its reconstructed 3D point. As a measure of similarity between ground-truth $n$ and estimated $\hat{n}$ surface normal vectors, the cosine similarity metric is used. This metric is defined as follows:

$$\mathcal{L}_{normal} = \frac{1}{2V}\sum_{x \in D}\left(1 - \frac{\hat{n} \cdot n}{\|\hat{n}\|\|n\|}\right). \quad (5)$$

Regarding optical flow and scene flow, the L1 loss is used to supervise training, when ground-truth optical flow or scene flow is available, as indicated below:

$$\mathcal{L}_{opt\_flow} = \frac{1}{HW}\sum|o_n - \hat{o}_n| \quad \mathcal{L}_{scn\_flow} = \frac{1}{HW}\sum|s_n - \hat{s}_n|. \quad (6)$$

Self-Supervised Losses. The self-supervised loss is defined as $\mathcal{L}_{self} = \mathcal{L}_{photo} + \mathcal{L}_{smooth}$. That is, a photometric loss is applied to the reprojection error between real and synthesized views, and a smoothness regularization is applied to the estimated depth maps 175. Each of these losses is discussed in further detail below.

Regarding the photometric error, given target $I_t$ and reference $I_{t+1}$ image frames (110a and 110b, respectively), it is possible to generate a synthesized version of $I_t$ by projecting information from $I_{t+1}$ between viewpoints. This projection can be done using either optical flow predictions (140) or 3D-motion predictions (depth 175 and scene flow 170), such that $\hat{I}_t^{opt\_flow}=I_{t+1}\langle x_i^t+\hat{o}_i\rangle$ and $\hat{I}_t^{motion}=I_{t+1}\langle KT_t^{t+1}(\hat{d}_tK^{-1}x_i^t+\hat{s}_t)\rangle$. The symbol $\langle\ \rangle$ represents a bilinear sampling operator that is locally sub-differentiable and thus can be used as part of an optimization pipeline. To measure the reconstruction error, the standard photometric loss including a SSIM (Structural Similarity Index) component and the L1 distance in pixel space is used. The total photometric loss is defined as follows:

$$\mathcal{L}_{photo} = \mathcal{L}_{photo}(I_t, \hat{I}_t^{opt\_flow}) + \mathcal{L}_{photo}(I_t, \hat{I}_t^{motion}). \quad (7)$$

In greater detail, this can be stated as follows. Given a target image $I_t$ and a synthesized image $\hat{I}_t$, the reconstruction error is computed through the standard photometric loss with a SSIM component and the L1 distance in pixel space, weighted by $\alpha=0.85$:

$$\mathcal{L}_{photo}(I_t, \hat{I}_t) = \alpha\frac{(1-SSIM(I_t, \hat{I}_t))}{2} + (1-\alpha)\|I_t - \hat{I}_t\|_1. \quad (8)$$

Regarding smoothness regularization, to enforce neighborhood consistency in the predicted depth maps, an edge-aware smoothness loss is used on the mean-normalized depth map $\hat{D}_t^*=\hat{D}_t/\overline{D}_t$. This loss enforces gradient smoothness in areas with low texture while allowing for depth discontinuities in high-textured areas (i.e., object boundaries). More specifically, the smoothness regularization may be expressed as follows:

$$\mathcal{L}_{smooth} = |\delta_x d_t^*|e^{-|\delta_x I_t|} + |\delta_y d_t^*|e^{-|\delta_y I_t|}, \quad (9)$$

where $\delta_x d_t^*$ is the gradient of depth along the x-axis, and $\delta_y d_t^*$ is the gradient of depth along the y-axis.

Consistency Losses. The consistency loss is defined as $\mathcal{L}_{cons}=\mathcal{L}_{opt\_flow}^{motion}+\mathcal{L}_{reverse}^{opt\_flow}+\mathcal{L}_{reverse}^{motion}+\mathcal{L}_{reproj}^{depth}$, respectively, constraining learned optical flow to be similar to projected depth and scene flow; backward/forward optical flow consistency; and backward/forward reprojected depth consistency. These concepts are discussed in greater detail below.

Regarding (forward) optical flow, as discussed above, in addition to directly estimating optical flow (see optical flow estimate 140 in FIG. 1), optical flow can also be estimated indirectly by projecting depth and scene flow estimates (see estimated depth map 175 and estimated scene flow 170 in FIG. 1) onto the image plane (Eq. 2 above). Constraining these two predictions of optical flow to be the same provides an additional source of regularization for the ill-posed problem of depth and scene flow estimation in a monocular setting.

$$\mathcal{L}_{opt\_flow}^{motion} = \frac{1}{HW}\sum|\hat{o}_i - (KT_t^{t+1}(\hat{d}_tK^{-1}x_i^t+\hat{s}_t)-x_i^t)| \quad (10)$$

Regarding reverse optical flow, another source of optical flow regularization comes from temporal consistency. In other words, the estimated forward optical flow should be the same as the back-projected estimated backward optical flow (and vice versa). This back-projected optical flow can be efficiently computed using the same warping coordinates calculated for the reprojections error. However, now instead of warping RGB values, optical-flow estimates are warped. Since the reverse optical flow is calculated, the sum of estimates is to be minimized rather than the difference. The same process can also be applied to the predicted optical flow calculated from motion (i.e., depth and scene flow) for an additional source of regularization.

$$\mathcal{L}_{reverse}^{opt\_flow} = \frac{1}{HW}\sum|\hat{O}_t + \hat{O}_{t+1}^{opt\_flow}\langle x_i^t+\hat{o}_i\rangle| \quad (11)$$

$$\mathcal{L}_{reverse}^{motion} = \frac{1}{HW}\sum \hat{O}_t^{motion} + \hat{O}_{t+1}^{motion}\langle KT_t^{t+1}(\hat{d}_tK^{-1}x_i^t+\hat{s}_t)\rangle \quad (12)$$

Regarding reprojected depth, depth estimates can also be temporally regularized by back-projecting estimates from one timestep onto another and enforcing similarity. Because depth changes with viewpoint, grid-sampling for depth reconstruction is performed on $\tilde{D}_t = |T_t^{t+1}(\hat{D}_{t+1} K^{-1} x_i^t + \hat{S}_t)|_z$—i.e., the back-projected range values from $\hat{D}_{t+1}$.

Embodiment 1

$$\mathcal{L}_{reproj}^{depth} = \frac{1}{HW} \sum |\hat{D}_t - \tilde{D}_t(KT_t^{t+1}(\hat{d}_t K^{-1} x_i^t + \hat{s}_t))| \quad (13)$$

Figure 2:
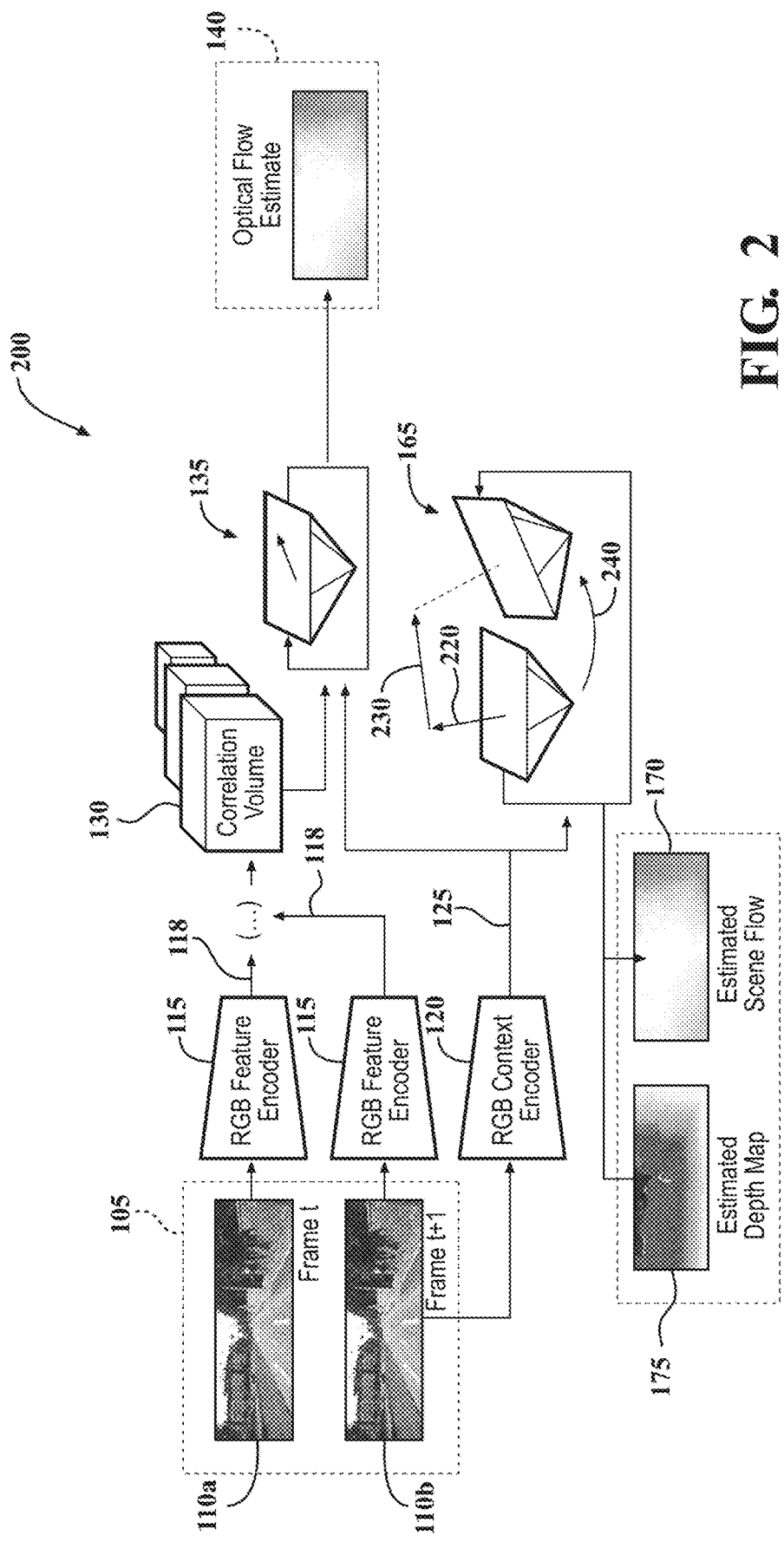
FIG. 2 illustrates an architecture of a system that jointly trains a machine-learning-based monocular optical flow, depth, and scene flow estimator, in accordance with another illustrative embodiment of the invention.

FIG. 2 illustrates an architecture 200 of a system that jointly trains a machine-learning-based monocular optical flow, depth, and scene flow estimator, in accordance with another illustrative embodiment of the invention (i.e., the family of embodiments referred to above as "Embodiment 1"). As shown in FIG. 2, Embodiment 1 does not include some of the elements discussed above in connection with the Combined Embodiment, such as optical flow triangulation operator 145, triangulated depth map 150, depth context encoder 155, and encoded depth context features 160. That is, Embodiment 1 does not include the mid-level fusion of encoded image context features 125 and encoded depth context features 160, as in the Combined Embodiment. As discussed above, Embodiment 1 includes direct estimation of optical flow and separate estimation of optical flow based on projecting estimated depth and scene flow to 2D (image) space and imposing a consistency loss between the two estimates of optical flow.

As shown in FIG. 2, network inputs 105 (image frame 110a and image frame 110b) are processed by RGB feature encoder 115 to produce encoded image features 118. As explained above, a correlation layer (not shown in FIG. 2) generates a correlation volume 130 from the encoded image features 118. RGB context encoder 120 processes image frame 110b ($I_{t+1}$) to produce encoded image context features 125. As discussed above, a GRU-based update operator 135 produces optical flow estimate 140 through iterative refinement with input from correlation volume 130 and encoded image context features 125. The upper portion of FIG. 2 that produces optical flow estimate 140 is sometimes referred to herein as a "first neural network structure."

As shown in FIG. 2, encoded image context features 125 are also input to GRU-based update operator 165 to produce estimated scene flow 170 and estimated depth map 175. This involves iteratively refining depth 220, scene flow 230, and pose 240. The lower portion of FIG. 2 that produces estimated scene flow 170 and estimated depth map 175 is sometimes referred to herein as a "second neural network structure."

As discussed above, a second optical flow estimate is generated from depth (estimated depth map 175) and estimated scene flow 170 via projection from 3D to 2D (not shown in FIG. 2). As also discussed above, a consistency loss (see Eqs. 10-13) is imposed between optical flow estimate 140 (the first optical flow estimate) and the second optical flow estimate to improve the performance of the first neural network structure in estimating optical flow (140) and the second neural network structure in estimating depth (175) and scene flow (170). This improved training carries over to improved performance of a robot (e.g., an autonomous vehicle) that employs the trained machine-learning model in a practical application involving the estimation of optical flow, depth, and/or scene flow.

Figure 3:
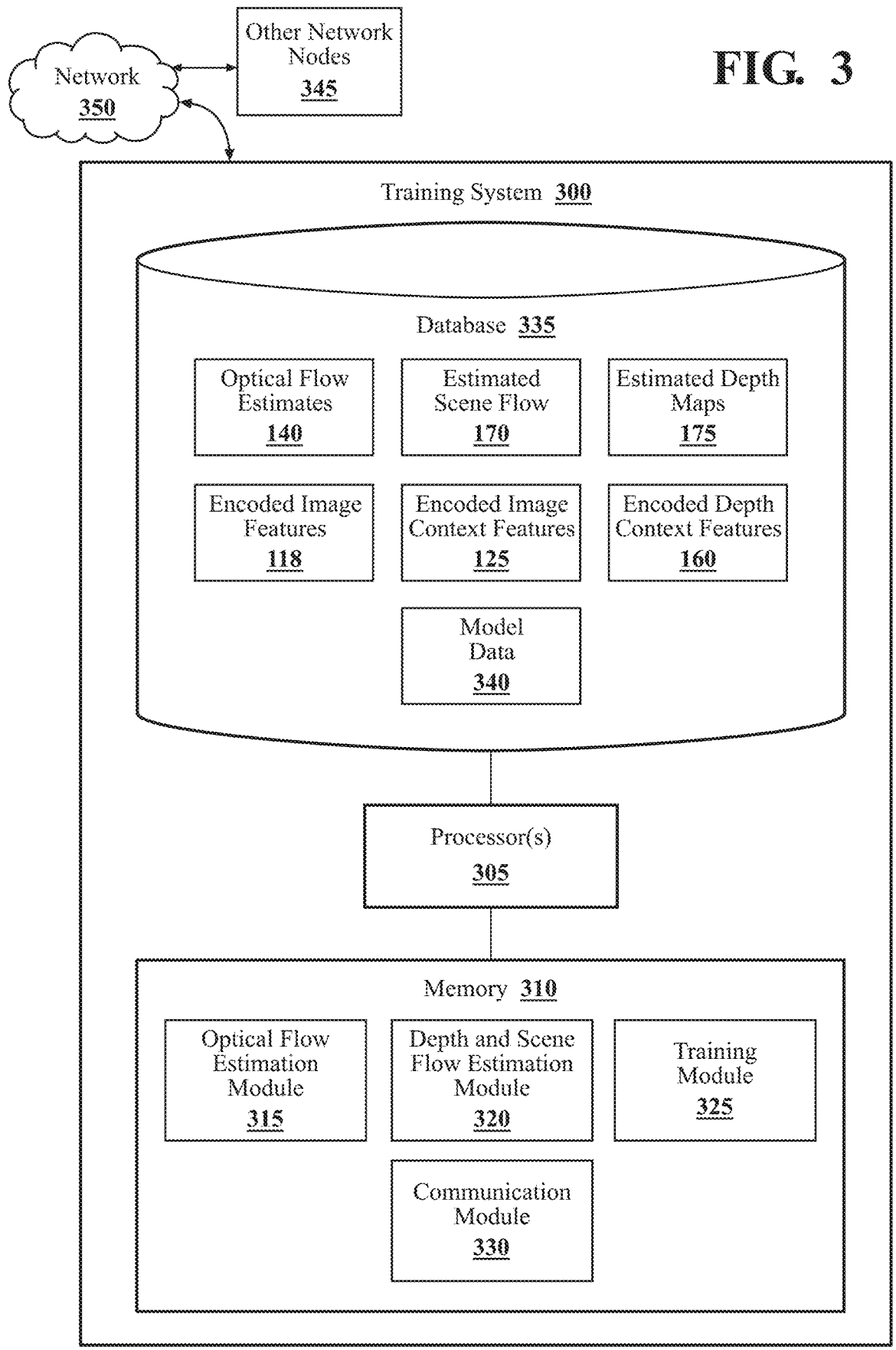
FIG. 3 is a block diagram of a training system that jointly trains a machine-learning-based monocular optical flow, depth, and scene flow estimator, in accordance with the embodiment illustrated in FIG. 2.

FIG. 3 is a block diagram of a training system 300 that jointly trains a machine-learning-based monocular optical flow, depth, and scene flow estimator, in accordance with the embodiment illustrated in FIG. 2. In some embodiments, training system 300 is implemented in a server. The training system 300 is shown as including one or more processors 305. Training system 300 also includes a memory 310 communicably coupled to the one or more processors 305. The memory 310 stores an optical flow estimation module 315, a depth and scene flow estimation module 320, a training module 325, and a communication module 330. The memory 310 is a random-access memory (RAM), read-only memory (ROM), a hard-disk drive, a flash memory, or other suitable memory for storing the modules 315, 320, 325, and 330. The modules 315, 320, 325, and 330 are, for example, computer-readable instructions that when executed by the one or more processors 305, cause the one or more processors 305 to perform the various functions disclosed herein.

In connection with its tasks, training system 300 can store various kinds of data in a database 335. For example, in the embodiment shown in FIG. 3, training system 300 stores, in database 335, optical flow estimates 140, estimated scene flow 170, estimated depth maps 175, encoded image features 118, encoded image context features 125, encoded depth context features 160, and model data 340. Model data 340 can include various kinds of data associated with training a machine-learning-based monocular optical flow, depth, and scene flow estimator, including, without limitation, model parameters, hyperparameters, the results of intermediate calculations, and the respective sets of weights characterizing the first and second neural network structures that are ultimately produced through the training process, once the training process is complete.

As shown in FIG. 3, training system 300 can communicate with other network nodes 345 (connected vehicles, infrastructure, other cloud servers, edge servers, mobile devices, etc.) via a network 350. In some embodiments, network 350 includes the Internet.

Optical flow estimation module 315 generally includes instructions that when executed by the one or more processors 305 cause the one or more processors 305 to process a pair of temporally adjacent monocular image frames (110a and 110b) using a first neural network structure to produce a first optical flow estimate 140. As described above in connection with the Combined Embodiment, optical flow estimation module 315 can, in some embodiments, include instructions to (1) extract a set of encoded image features 118 from the pair of temporally adjacent monocular image frames 110a and 110b using a RGB feature encoder 115; (2) process the set of encoded image features 118 using a correlation layer to generate a correlation volume 130; (3) extract a set of encoded image context features 125 from at least one image frame in the pair of temporally adjacent monocular image frames 110a and 110b using a RGB context encoder 120; and (4) refine iteratively an initial estimate of optical flow based, at least in part, on the set of encoded image context features 125 using a GRU-based update operator 135 and the correlation volume 130. The result of this iterative process is optical flow estimate 140. As also discussed above, the pair of temporally adjacent monocular image frames 110a and 110b can be synthetic images generated by a computing device, or they can be real-world images produced by a camera. In some embodiments, synthetic and real-world images are used together in a mixed-batch mode to train the neural networks in the machine-learning-based monocular optical flow, depth, and scene flow estimator.

Depth and scene flow estimation module 320 generally includes instructions that when executed by the one or more processors 305 cause the one or more processors 305 to process the pair of temporally adjacent monocular image frames 110a and 110b using a second neural network structure to produce an estimated depth map 175 and estimated scene flow 170. Depth and scene flow estimation module 320 also includes instructions that when executed by the one or more processors 305 cause the one or more processors 305 to process the estimated depth map 175 and the estimated scene flow 170 using the second neural network structure to produce a second optical flow estimate. As explained above in connection with the Combined Embodiment, to produce the estimated depth map 175 and the estimated scene flow 170, depth and scene flow estimation module 320 can include instructions to extract a set of encoded image context features 125 from at least one image frame in the pair of temporally adjacent monocular image frames 110a and 110b using a RGB context encoder 120 and to refine iteratively an initial estimate of depth and an initial estimate of scene flow based, at least in part, on the set of encoded image context features 125 using a GRU-based update operator 165.

As also discussed above, to produce the second optical flow estimate, depth and scene flow estimation module 320 can include instructions to project the estimated depth map 175 and the estimated scene flow 170 from 3D space to 2D space (see Eq. 2 and other details discussed above in connection with the Combined Embodiment).

Training module 325 generally includes instructions that when executed by the one or more processors 305 cause the one or more processors 305 to impose a consistency loss (see Eqs. 10-13 above) between the first optical flow estimate 140 and the second optical flow estimate that minimizes the difference between the first optical flow estimate and the second optical flow estimate to improve the performance of the first neural network structure in estimating optical flow 140 and the second neural network structure in estimating depth 175 and scene flow 170.

Communication module 330 generally includes instructions that when executed by the one or more processors 305 cause the one or more processors 305 to transmit a first set of weights corresponding to the first neural network structure after training by training system 300 and a second set of weights corresponding to the second neural network structure after training by training system 300 to a robot whose operation is controlled, at least in part, based on one or more of estimated optical flow 140, estimated depth 175, and estimated scene flow 170 produced at the robot using the first set of weights, the second set of weights, or both. In other words, the characteristic parameters (weights) for the trained neural networks produced by training system 300 can be downloaded via network 350 to a robot that configures an onboard machine-learning-based model with those weights to estimate optical flow, depth, and/or scene flow to control, at least in part, the robot's operation (e.g., performing scene reconstruction, navigation, path planning, object detection and tracking, obstacle avoidance, mapping, etc.).

The techniques employed in Embodiment 1 to produce a trained machine-learning-based monocular optical flow, depth, and scene flow estimator can be applied to a variety of different kinds of robots. For example, the robot to which the first and second sets of machine-model weights are downloaded could be, without limitation, an autonomous or semi-autonomous vehicle, a search and rescue robot, a delivery robot, an aerial drone, or an indoor robot (e.g., a service robot or a manufacturing robot).

Figure 4:
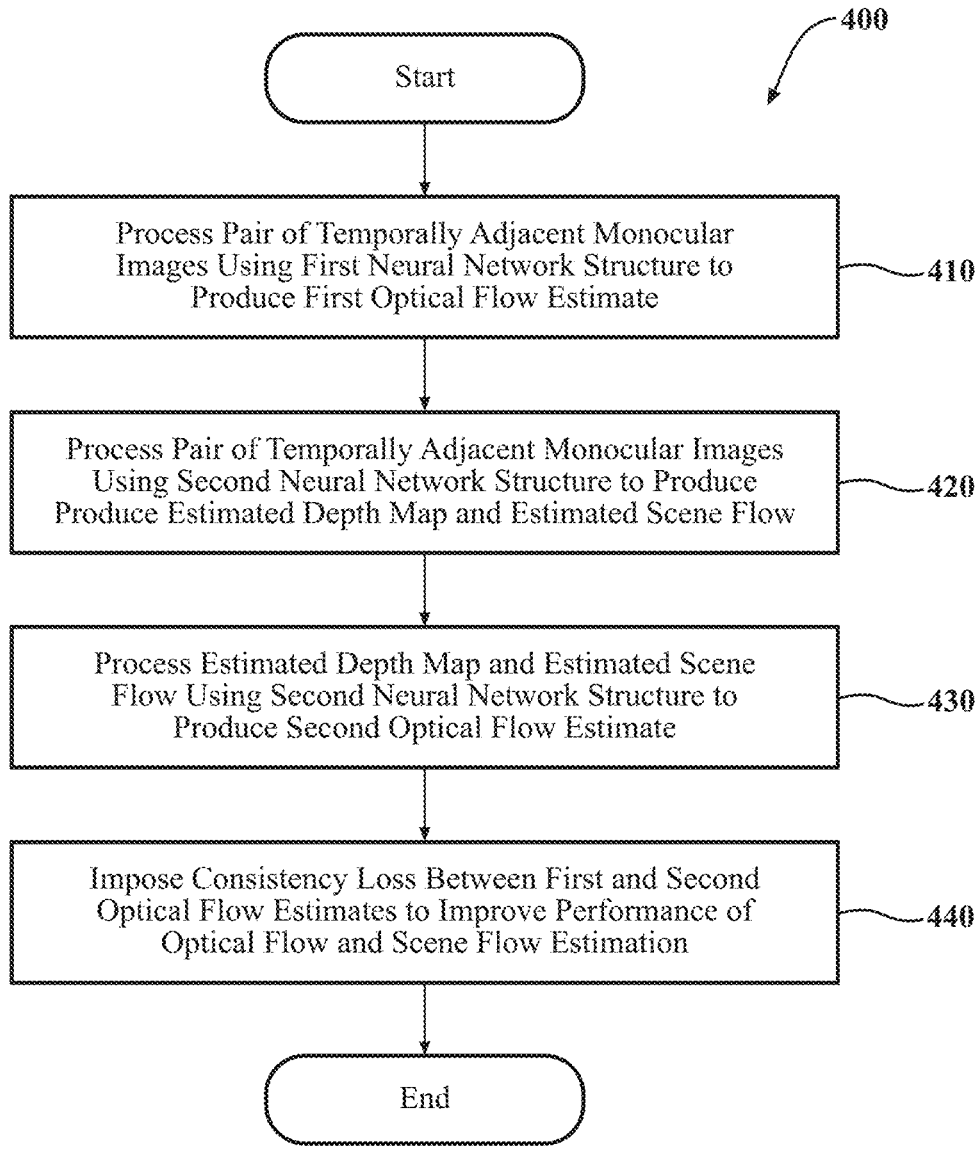
FIG. 4 is a flowchart of a method of jointly training a machine-learning-based monocular optical flow, depth, and scene flow estimator, in accordance with the embodiment illustrated in FIGS. 2 and 3.

FIG. 4 is a flowchart of a method 400 of jointly training a machine-learning-based monocular optical flow, depth, and scene flow estimator, in accordance with the embodiment (Embodiment 1) illustrated in FIGS. 2 and 3. Method 400 will be discussed from the perspective of training system 300 in FIG. 3. While method 400 is discussed in combination with training system 300, it should be appreciated that method 400 is not limited to being implemented within training system 300, but training system 300 is instead one example of a system that may implement method 400. Also, method 400 applies many of the same techniques and mathematical concepts as described above in connection with the Combined Embodiment.

At block 410, optical flow estimation module 315 processes a pair of temporally adjacent monocular image frames 110a and 110b using a first neural network structure to produce a first optical flow estimate 140. As discussed above, this can include (1) extracting a set of encoded image features 118 from the pair of temporally adjacent monocular image frames 110a and 110b using a RGB feature encoder 115; (2) processing the set of encoded image features 118 using a correlation layer to generate a correlation volume 130; (3) extracting a set of encoded image context features 125 from at least one image frame in the pair of temporally adjacent monocular image frames 110a and 110b using a RGB context encoder 120; and (4) refining iteratively an initial estimate of optical flow based, at least in part, on the set of encoded image context features 125 using a GRU-based update operator 135 and the correlation volume 130. The result of this iterative process is optical flow estimate 140. As also discussed above, the pair of temporally adjacent monocular image frames 110a and 110b can be synthetic images generated by a computing device, or they can be real-world images produced by a camera. In some embodiments, synthetic and real-world images are used together in a mixed-batch mode to train the neural networks in the machine-learning-based monocular optical flow, depth, and scene flow estimator.

At block 420, depth and scene flow estimation module 320 processes the pair of temporally adjacent monocular image frames using a second neural network structure to produce an estimated depth map 175 and an estimated scene flow 170. As discussed above, to produce the estimated depth map 175 and the estimated scene flow 170, depth and scene flow estimation module 320 can include instructions to extract a set of encoded image context features 125 from at least one image frame in the pair of temporally adjacent monocular image frames 110a and 110b using a RGB context encoder 120 and to refine iteratively an initial estimate of depth and an initial estimate of scene flow based, at least in part, on the set of encoded image context features 125 using a GRU-based update operator 165.

At block 430, depth and scene flow estimation module 320 processes the estimated depth map 175 and the estimated scene flow 170 using the second neural network structure to produce a second optical flow estimate. As discussed above, to produce the second optical flow estimate, depth and scene flow estimation module 320 can include instructions to project the estimated depth map 175 and the estimated scene flow 170 from 3D space to 2D space (see Eq. 2 above).

At block 440, training module 325 imposes a consistency loss (Eqs. 10-13 above) between the first optical flow estimate 140 and the second optical flow estimate that minimizes the difference between the first optical flow estimate 140 and the second optical flow estimate to improve performance of the first neural network structure in estimating optical flow 140 and the second neural network structure in estimating depth 175 and scene flow 170.

In some embodiments, method 400 includes additional actions that are not shown in FIG. 4. For example, in some embodiments, communication module 330 transmits a first set of weights corresponding to the first neural network structure after training and a second set of weights corresponding to the second neural network structure after training to a robot whose operation (e.g., performing scene reconstruction, navigation, path planning, object detection and tracking, obstacle avoidance, mapping, etc.) is controlled, at least in part, based on one or more of estimated optical flow 140, estimated depth 175, and estimated scene flow 170 produced at the robot using the first set of weights, the second set of weights, or both. As discussed above, the techniques employed in Embodiment 1 to produce a trained machine-learning-based monocular optical flow, depth, and scene flow estimator can be applied to a variety of different kinds of robots. For example, the robot to which the first and second sets of machine-model weights are downloaded could be, without limitation, an autonomous or semi-autonomous vehicle, a search and rescue robot, a delivery robot, an aerial drone, or an indoor robot (e.g., a service robot or a manufacturing robot).

Embodiment 2

Figure 5:
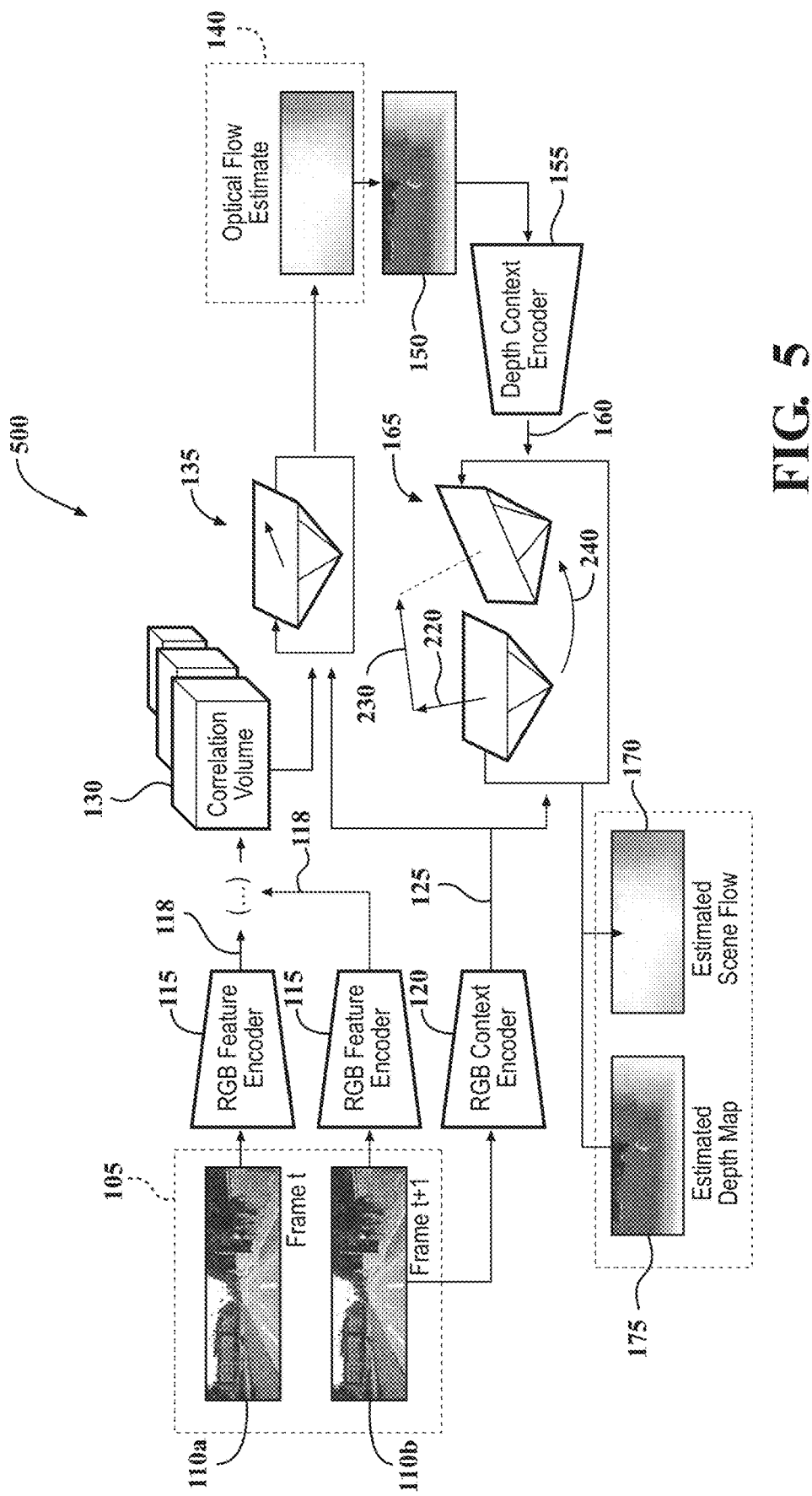
FIG. 5 illustrates an architecture of a system that jointly trains a machine-learning-based monocular optical flow, depth, and scene flow estimator, in accordance with yet another illustrative embodiment of the invention.

FIG. 5 illustrates an architecture 500 of a system that jointly trains a machine-learning-based monocular optical flow, depth, and scene flow estimator, in accordance with another illustrative embodiment of the invention (i.e., the family of embodiments referred to above as "Embodiment 2"). Embodiment 2 does not include certain aspects of the Combined Embodiment discussed above, namely producing an optical flow estimate 140 using a first neural network structure, producing a second optical flow estimate using a second neural network structure based on projecting estimated depth 175 and scene flow 170 to 2D (image) space, and imposing a consistency loss between the two estimates of optical flow to improve the training of the neural networks in the first and second neural network structures. Instead, Embodiment 2 includes the mid-level-fusion elements and techniques discussed above in connection with the Combined Embodiment that are absent from Embodiment 1.

As shown in FIG. 5, network inputs 105 (image frame 110a and image frame 110b) are processed by RGB feature encoder 115 to produce encoded image features 118. As explained above, a correlation layer (not shown in FIG. 5) generates a correlation volume 130 from the encoded image features 118. RGB context encoder 120 processes image frame 110b ($I_{t+1}$) to produce encoded image context features 125. As discussed above, a GRU-based update operator 135 produces optical flow estimate 140 through iterative refinement with input from correlation volume 130 and encoded image context features 125. The upper portion of FIG. 5 that produces optical flow estimate 140 is sometimes referred to herein as a "first neural network structure."

As shown in FIG. 5, optical flow estimate 140 is triangulated (see discussion above in connection with the Combined Embodiment, Eq. 1) to produce a triangulated depth map 150. A depth context encoder 155 processes the triangulated depth map 150 to produce encoded depth context features 160.

The encoded depth context features 160 are combined with (e.g., in some embodiments, numerically added to) the encoded image context features 125 as input to the iterative refining process that produces estimated depth map 175 and estimated scene flow 170. More specifically, as shown in FIG. 5 (refer also to FIG. 1, Elements 125 and 160), the combined encoded image context features 125 and encoded depth context features 160 are input to a GRU-based update operator 165 to produce estimated scene flow 170 and estimated depth map 175. This involves iteratively refining depth 220, scene flow 230, and pose 240. The lower portion of FIG. 5 including GRU-based update operator 165 that produces estimated scene flow 170 and estimated depth map 175 is sometimes referred to herein as a "second neural network structure."

As discussed above, combining the encoded image context features 125 and the encoded depth context features 160 constitutes mid-level fusion of the encoded features, as opposed to early fusion (fusion at the inputs) or late fusion (fusion at the outputs). The innovative mid-level fusion employed in Embodiment 2 (and in the Combined Embodiment) has the effect, during training, of improving the performance of the second neural network structure in estimating depth 175 and scene flow 170. This improved training carries over to improved performance of a robot (e.g., an autonomous vehicle) that employs the trained machine-learning model in a practical application involving the estimation of depth and/or scene flow.

Figure 6:
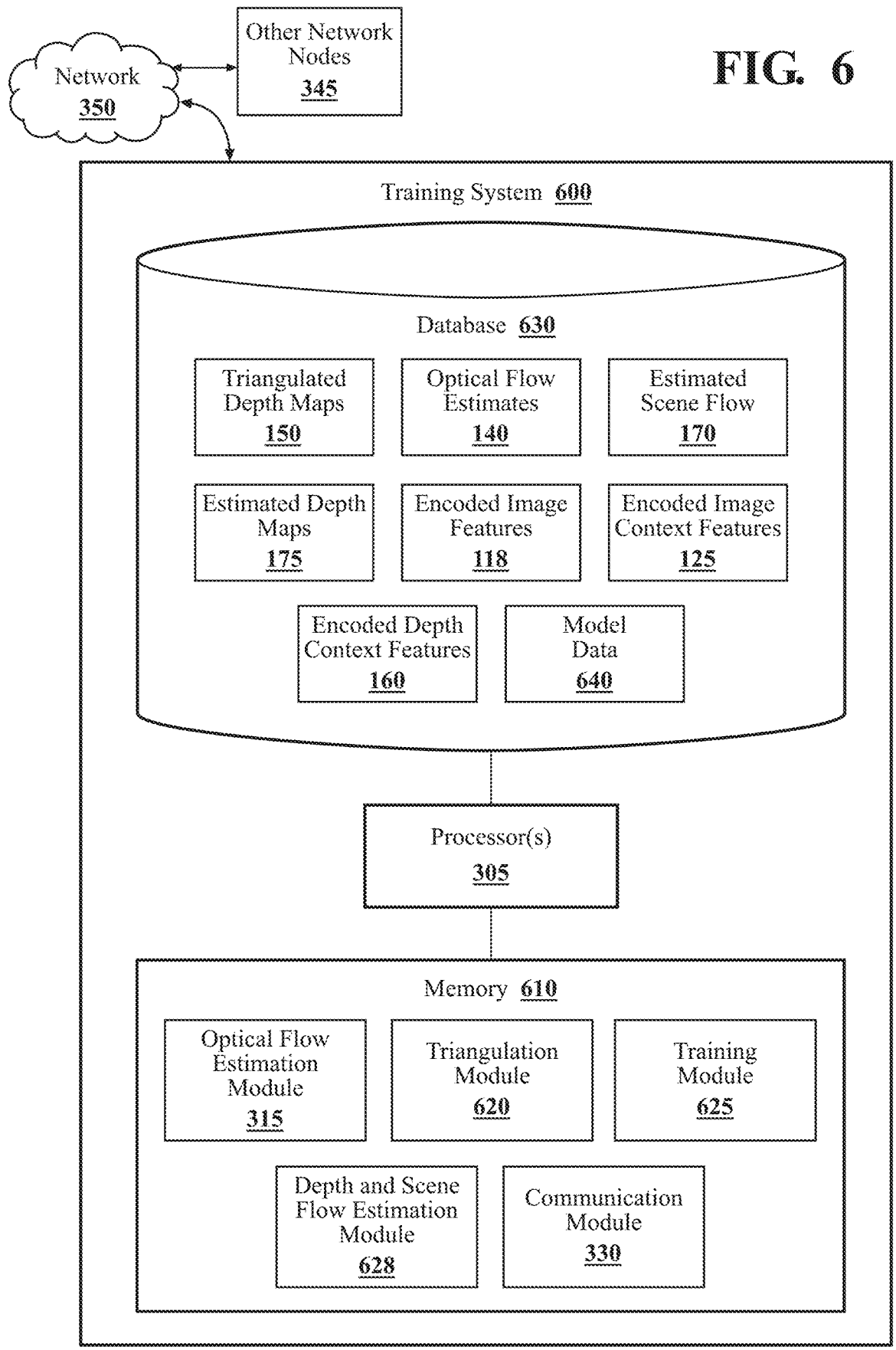
FIG. 6 is a block diagram of a training system that jointly trains a machine-learning-based monocular optical flow, depth, and scene flow estimator, in accordance with the embodiment illustrated in FIG. 5.

FIG. 6 is a block diagram of a training system 600 that jointly trains a machine-learning-based monocular optical flow, depth, and scene flow estimator, in accordance with the embodiment illustrated in FIG. 5. In some embodiments, training system 600 is implemented in a server. The training system 600 is shown as including one or more processors 305. Training system 600 also includes a memory 610 communicably coupled to the one or more processors 305. The memory 610 stores an optical flow estimation module 315, a triangulation module 620, a training module 625, a depth and scene flow estimation module 628, and a communication module 330. The memory 610 is a random-access memory (RAM), read-only memory (ROM), a hard-disk drive, a flash memory, or other suitable memory for storing the modules 315, 620, 625, 628, and 330. The modules 315, 620, 625, 628, and 330 are, for example, computer-readable instructions that when executed by the one or more processors 305, cause the one or more processors 305 to perform the various functions disclosed herein.

In connection with its tasks, training system 600 can store various kinds of data in a database 630. For example, in the embodiment shown in FIG. 6, training system 600 stores, in database 630, optical flow estimates 140, estimated scene flow 170, estimated depth maps 175, encoded image features 118, encoded image context features 125, encoded depth context features 160, and model data 640. Model data 640 can include various kinds of data associated with training a machine-learning-based monocular optical flow, depth, and scene flow estimator, including, without limitation, model parameters, hyperparameters, the results of intermediate calculations, and the respective sets of weights characterizing the first and second neural network structures that are ultimately produced through the training process, once the training process is complete.

As shown in FIG. 6, training system 600 can communicate with other network nodes 345 (connected vehicles, infrastructure, other cloud servers, edge servers, mobile devices, etc.) via a network 350. In some embodiments, network 350 includes the Internet.

Optical flow estimation module 315 generally includes instructions that when executed by the one or more processors 305 cause the one or more processors 305 to process a pair of temporally adjacent monocular image frames 110a and 110b using a first neural network structure to produce an optical flow estimate 140 and to extract, from at least one image frame in the pair of temporally adjacent monocular image frames 110a and 110b, a set of encoded image context features 125. As described above in connection with the Combined Embodiment, optical flow estimation module 315 can, in some embodiments, include instructions to (1) extract the set of encoded image context features 125 using a RGB context encoder 120; (2) extract a set of encoded image features 118 from the pair of temporally adjacent monocular image frames 110*a* and 110*b* using a RGB encoder 115; (3) process the set of encoded image features 118 using a correlation layer to generate a correlation volume 130; and (4) refine iteratively an initial estimate of optical flow based, at least in part, on the set of encoded image context features using a GRU-based update operator 135 and the correlation volume 130. The result of this iterative process is optical flow estimate 140. As also discussed above, the pair of temporally adjacent monocular image frames 110*a* and 110*b* can be synthetic images generated by a computing device, or they can be real-world images produced by a camera. In some embodiments, synthetic and real-world images are used together in a mixed-batch mode to train the neural networks in the machine-learning-based monocular optical flow, depth, and scene flow estimator.

Triangulation module 620 generally includes instructions that when executed by the one or more processors 305 cause the one or more processors 305 to triangulate the optical flow estimate 140 to generate a triangulated depth map 150, as discussed above in connection with the Combined Embodiment (see Eq. 1 above).

Training module 625 generally includes instructions that when executed by the one or more processors 305 cause the one or more processors 305 to extract a set of encoded depth context features 160 from the triangulated depth map 150 using a depth context encoder 155. Training module 625 also includes instructions to combine the set of encoded image context features 125 and the set of encoded depth context features 160 to improve the performance of the second neural network structure in estimating depth 175 and scene flow 170. As discussed above, in some embodiments, the encoded image context features 125 and the encoded depth context features 160 are combined by numerically adding them (i.e., the corresponding components of each are numerically added to each other).

Depth and scene flow estimation module 628 generally includes instructions that when executed by the one or more processors 305 cause the one or more processors 305 to estimate depth 175 and scene flow 170 by refining iteratively an initial estimate of depth and an initial estimate of scene flow based, at least in part, on the combined set of encoded image context features 125 and the set of encoded depth context features 160 using a GRU-based update operator 165 in the second neural network structure. As discussed above, the mid-level fusion (combining of encoded image context features 125 and encoded depth context features 160) employed in Embodiment 2 improves the performance of the second neural network structure in estimating depth 175 and scene flow 170. The improved training of the neural networks by training system 600 carries over to improved performance of a machine-learning-based monocular optical flow, depth, and scene flow estimator in a robot when the parameters (e.g., model weights) of the estimator are downloaded to the robot for use in a practical application.

Communication module 330 generally includes instructions that when executed by the one or more processors 305 cause the one or more processors 305 to transmit a first set of weights corresponding to the first neural network structure after training by training system 600 and a second set of weights corresponding to the second neural network structure after training by training system 600 to a robot whose operation is controlled, at least in part, based on one or more of estimated optical flow 140, estimated depth 175, and estimated scene flow 170 produced at the robot using the first set of weights, the second set of weights, or both. In other words, the characteristic parameters (weights) for the trained neural networks produced by training system 600 can be downloaded via network 350 to a robot that configures an onboard machine-learning-based model with those weights to estimate optical flow, depth, and/or scene flow to control, at least in part, the robot's operation (e.g., performing scene reconstruction, navigation, path planning, object detection and tracking, obstacle avoidance, mapping, etc.).

The techniques employed in Embodiment 2 to produce a trained machine-learning-based monocular optical flow, depth, and scene flow estimator can be applied to a variety of different kinds of robots. For example, the robot to which the first and second sets of machine-model weights are downloaded could be, without limitation, an autonomous or semi-autonomous vehicle, a search and rescue robot, a delivery robot, an aerial drone, or an indoor robot (e.g., a service robot or a manufacturing robot).

Figure 7:
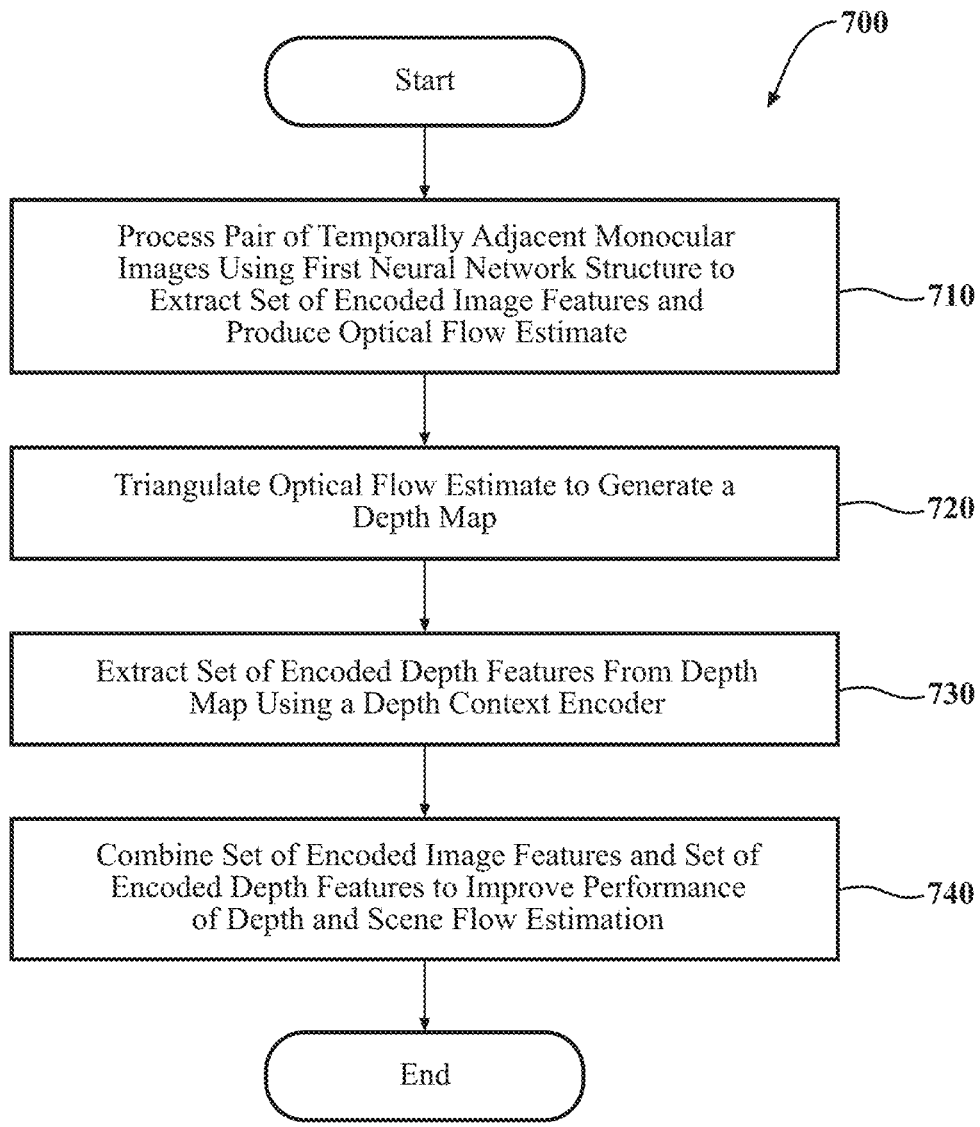
FIG. 7 is a flowchart of a method of jointly training a machine-learning-based monocular optical flow, depth, and scene flow estimator, in accordance with the embodiment illustrated in FIGS. 5 and 6.

FIG. 7 is a flowchart of a method 700 of jointly training a machine-learning-based monocular optical flow, depth, and scene flow estimator, in accordance with the embodiment (Embodiment 2) illustrated in FIGS. 5 and 6. Method 700 will be discussed from the perspective of training system 600 in FIG. 6. While method 700 is discussed in combination with training system 600, it should be appreciated that method 700 is not limited to being implemented within training system 600, but training system 600 is instead one example of a system that may implement method 700. Also, method 700 applies many of the same techniques and mathematical concepts as described above in connection with the Combined Embodiment.

At block 710, optical flow estimation module 315 processes a pair of temporally adjacent monocular image frames 110*a* and 110*b* using a first neural network structure to produce an optical flow estimate 140 and to extract, from at least one image frame in the pair of temporally adjacent monocular image frames 110*a* and 110*b*, a set of encoded image context features 125. As discussed above, producing the optical flow estimate 140 can include (1) extracting the set of encoded image context features 125 using a RGB context encoder 120; (2) extracting a set of encoded image features 118 from the pair of temporally adjacent monocular image frames 110*a* and 110*b* using a RGB encoder 115; (3) processing the set of encoded image features 118 using a correlation layer to generate a correlation volume 130; and (4) refining iteratively an initial estimate of optical flow based, at least in part, on the set of encoded image context features using a GRU-based update operator 135 and the correlation volume 130. The result of this iterative process is optical flow estimate 140. As also discussed above, the pair of temporally adjacent monocular image frames 110*a* and 110*b* can be synthetic images generated by a computing device, or they can be real-world images produced by a camera. In some embodiments, synthetic and real-world images are used together in a mixed-batch mode to train the neural networks in the machine-learning-based monocular optical flow, depth, and scene flow estimator.

At block 720, triangulation module 620 triangulates the optical flow estimate 140 to generate a triangulated depth map 150, as discussed above in connection with the Combined Embodiment (see Eq. 1).

At block 730, training module 625 extracts a set of encoded depth context features 160 from the triangulated depth map 150 using a depth context encoder 155, as discussed above.

At block 740, training module 625 combines the set of encoded image context features 125 and the set of encoded depth context features 160 to improve the performance of the second neural network structure in estimating depth 175 and scene flow 170. As discussed above, in some embodiments, the encoded image context features 125 and the encoded depth context features 160 are combined by numerically adding them (i.e., the corresponding components of each are numerically added to each other).

In some embodiments, method 700 includes additional actions that are not shown in FIG. 7. For example, in some embodiments, depth and scene flow estimation module 628 estimates depth 175 and scene flow 170 by refining iteratively an initial estimate of depth and an initial estimate of scene flow based, at least in part, on the combined set of encoded image context features 125 and set of encoded depth context features 160 using a GRU-based update operator 165 in the second neural network structure, as discussed above. Also, in some embodiments, communication module 330 transmits a first set of weights corresponding to the first neural network structure after training and a second set of weights corresponding to the second neural network structure after training to a robot whose operation (e.g., performing scene reconstruction, navigation, path planning, object detection and tracking, obstacle avoidance, mapping, etc.) is controlled, at least in part, based on one or more of estimated optical flow 140, estimated depth 175, and estimated scene flow 170 produced at the robot using the first set of weights, the second set of weights, or both. As discussed above, the techniques employed in Embodiment 2 to produce a trained machine-learning-based monocular optical flow, depth, and scene flow estimator can be applied to a variety of different kinds of robots. For example, the robot to which the first and second sets of machine-model weights are downloaded could be, without limitation, an autonomous or semi-autonomous vehicle, a search and rescue robot, a delivery robot, an aerial drone, or an indoor robot (e.g., a service robot or a manufacturing robot).

CONCLUSION

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for jointly training a machine-learning-based monocular optical flow, depth, and scene flow estimator, the system comprising:
    one or more processors; and
    a memory communicably coupled to the one or more processors and storing:
    an optical flow estimation module including instructions that when executed by the one or more processors cause the one or more processors to process a pair of temporally adjacent monocular image frames using a first neural network structure to produce a first optical flow estimate;
    a depth and scene flow estimation module including instructions that when executed by the one or more processors cause the one or more processors to:
        process the pair of temporally adjacent monocular image frames using a second neural network structure to produce an estimated depth map and an estimated scene flow; and
        process the estimated depth map and the estimated scene flow using the second neural network structure to produce a second optical flow estimate; and
    a training module including instructions that when executed by the one or more processors cause the one or more processors to impose a consistency loss between the first optical flow estimate and the second optical flow estimate that minimizes a difference between the first optical flow estimate and the second optical flow estimate to improve performance of the first neural network structure in estimating optical flow and the second neural network structure in estimating depth and scene flow.

2. The system of claim 1, wherein the instructions in the optical flow estimation module to process the pair of temporally adjacent monocular image frames using the first neural network structure to produce the first optical flow estimate include instructions that when executed by the one or more processors cause the one or more processors to:
    extract a set of encoded image features from the pair of temporally adjacent monocular image frames using a Red-Green-Blue (RGB) encoder;
    process the set of encoded image features using a correlation layer to generate a correlation volume;
    extract a set of encoded image context features from at least one image frame in the pair of temporally adjacent monocular image frames using a RGB context encoder; and
    refine iteratively an initial estimate of optical flow based, at least in part, on the set of encoded image context features using a Gated-Recurrent-Units-based update operator and the correlation volume.

3. The system of claim 1, wherein the instructions in the depth and scene flow estimation module to process the pair of temporally adjacent monocular image frames using the second neural network structure to produce the estimated depth map and the estimated scene flow include instructions that when executed by the one or more processors cause the one or more processors to:
    extract a set of encoded image context features from at least one image frame in the pair of temporally adjacent monocular image frames using a Red-Green-Blue (RGB) context encoder; and
    refine iteratively an initial estimate of depth and an initial estimate of scene flow based, at least in part, on the set of encoded image context features using a Gated-Recurrent-Units-based update operator.

4. The system of claim 1, wherein the instructions in the depth and scene flow estimation module to process the estimated depth map and the estimated scene flow to produce the second optical flow estimate include instructions that when executed by the one or more processors cause the one or more processors to project the estimated depth map and the estimated scene flow from three-dimensional (3D) space to two-dimensional (2D) space.

5. The system of claim 1, wherein the pair of temporally adjacent monocular image frames are one of synthetic images generated by a computing device and real-world images produced by a camera.

6. The system of claim 1, further comprising a communication module including instructions that when executed by the one or more processors cause the one or more processors to transmit a first set of weights corresponding to the first neural network structure after training and a second set of weights corresponding to the second neural network structure after training to a robot whose operation is controlled, at least in part, based on one or more of estimated optical flow, estimated depth, and estimated scene flow produced at the robot using at least one of the first set of weights and the second set of weights.

7. The system of claim 6, wherein the robot is one of an autonomous vehicle, a search and rescue robot, a delivery robot, an aerial drone, and an indoor robot.

8. A non-transitory computer-readable medium for jointly training a machine-learning-based monocular optical flow, depth, and scene flow estimator and storing instructions that when executed by one or more processors cause the one or more processors to:
  process a pair of temporally adjacent monocular image frames using a first neural network structure to produce a first optical flow estimate;
  process the pair of temporally adjacent monocular image frames using a second neural network structure to produce an estimated depth map and an estimated scene flow;
  process the estimated depth map and the estimated scene flow using the second neural network structure to produce a second optical flow estimate; and
  impose a consistency loss between the first optical flow estimate and the second optical flow estimate that minimizes a difference between the first optical flow estimate and the second optical flow estimate to improve performance of the first neural network structure in estimating optical flow and the second neural network structure in estimating depth and scene flow.

9. The non-transitory computer-readable medium of claim 8, wherein the instructions to process the pair of temporally adjacent monocular image frames using the first neural network structure to produce the first optical flow estimate include instructions to:
  extract a set of encoded image features from the pair of temporally adjacent monocular image frames using a Red-Green-Blue (RGB) encoder;
  process the set of encoded image features using a correlation layer to generate a correlation volume;
  extract a set of encoded image context features from at least one image frame in the pair of temporally adjacent monocular image frames using a RGB context encoder; and
  refine iteratively an initial estimate of optical flow based, at least in part, on the set of encoded image context features using a Gated-Recurrent-Units-based update operator and the correlation volume.

10. The non-transitory computer-readable medium of claim 8, wherein the instructions to process the pair of temporally adjacent monocular image frames using the second neural network structure to produce the estimated depth map and the estimated scene flow include instructions to:
  extract a set of encoded image context features from at least one image frame in the pair of temporally adjacent monocular image frames using a Red-Green-Blue (RGB) context encoder; and
  refine iteratively an initial estimate of depth and an initial estimate of scene flow based, at least in part, on the set of encoded image context features using a Gated-Recurrent-Units-based update operator.

11. The non-transitory computer-readable medium of claim 8, wherein the instructions to process the estimated depth map and the estimated scene flow to produce the second optical flow estimate include instructions to project the estimated depth map and the estimated scene flow from three-dimensional (3D) space to two-dimensional (2D) space.

12. The non-transitory computer-readable medium of claim 8, wherein the instructions include further instructions that when executed by one or more processors cause the one or more processors to transmit a first set of weights corresponding to the first neural network structure after training and a second set of weights corresponding to the second neural network structure after training to a robot whose operation is controlled, at least in part, based on one or more of estimated optical flow, estimated depth, and estimated scene flow produced at the robot using at least one of the first set of weights and the second set of weights.

13. The non-transitory computer-readable medium of claim 12, wherein the robot is one of an autonomous vehicle, a search and rescue robot, a delivery robot, an aerial drone, and an indoor robot.

14. A method of jointly training a machine-learning-based monocular optical flow, depth, and scene flow estimator, the method comprising:
  processing a pair of temporally adjacent monocular image frames using a first neural network structure to produce a first optical flow estimate;
  processing the pair of temporally adjacent monocular image frames using a second neural network structure to produce an estimated depth map and an estimated scene flow;
  processing the estimated depth map and the estimated scene flow using the second neural network structure to produce a second optical flow estimate; and
  imposing a consistency loss between the first optical flow estimate and the second optical flow estimate that minimizes a difference between the first optical flow estimate and the second optical flow estimate to improve performance of the first neural network structure in estimating optical flow and the second neural network structure in estimating depth and scene flow.

15. The method of claim 14, wherein the processing the pair of temporally adjacent monocular image frames using the first neural network structure to produce the first optical flow estimate includes:
  extracting a set of encoded image features from the pair of temporally adjacent monocular image frames using a Red-Green-Blue (RGB) encoder;
  processing the set of encoded image features using a correlation layer to generate a correlation volume;
  extracting a set of encoded image context features from at least one image frame in the pair of temporally adjacent monocular image frames using a RGB context encoder; and
  refining iteratively an initial estimate of optical flow based, at least in part, on the set of encoded image context features using a Gated-Recurrent-Units-based update operator and the correlation volume.

16. The method of claim 14, wherein the processing the pair of temporally adjacent monocular image frames using the second neural network structure to produce the estimated depth map and the estimated scene flow includes:
  extracting a set of encoded image context features from at least one image frame in the pair of temporally adjacent monocular image frames using a Red-Green-Blue (RGB) context encoder; and
  refining iteratively an initial estimate of depth and an initial estimate of scene flow based, at least in part, on the set of encoded image context features using a Gated-Recurrent-Units-based update operator.

17. The method of claim 14, wherein processing the estimated depth map and the estimated scene flow to produce the second optical flow estimate incudes projecting the estimated depth map and the estimated scene flow from three-dimensional (3D) space to two-dimensional (2D) space.

18. The method of claim 14, wherein the pair of temporally adjacent monocular image frames are one of synthetic images generated by a computing device and real-world images produced by a camera.

19. The method of claim 14, further comprising transmitting a first set of weights corresponding to the first neural network structure after training and a second set of weights corresponding to the second neural network structure after training to a robot whose operation is controlled, at least in part, based on one or more of estimated optical flow, estimated depth, and estimated scene flow produced at the robot using at least one of the first set of weights and the second set of weights.

20. The method of claim 19, wherein the robot is one of an autonomous vehicle, a search and rescue robot, a delivery robot, an aerial drone, and an indoor robot.

\* \* \* \* \*

UNITED STATES PATENT AND TRADEMARK OFFICE
CERTIFICATE OF CORRECTION

PATENT NO. : 11,948,310 B2
APPLICATION NO. : 17/489237
DATED : April 2, 2024
INVENTOR(S) : Guizilini It is certified that error appears in the above-identified patent and that said Letters Patent is hereby corrected as shown below:

In the Claims

Claim 17, Column 22, Line 3: Replace "incudes" with --includes--

Signed and Sealed this
Seventh Day of May, 2024

Katherine Kelly Vidal
*Director of the United States Patent and Trademark Office*